United States Patent
Nurminen et al.

(10) Patent No.: US 12,085,411 B2
(45) Date of Patent: Sep. 10, 2024

(54) MULTIPLE MODE LEARNING OF ABSOLUTE ALTITUDE OF FLOORS OF A BUILDING

(71) Applicant: HERE Global B.V., Eindhoven (NL)

(72) Inventors: Henri Jaakko Julius Nurminen, Tampere (FI); Marko Luomi, Lempaeaelae (FI); Pavel Ivanov, Tampere (FI); Lauri Aarne Johannes Wirola, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 387 days.

(21) Appl. No.: 17/644,465

(22) Filed: Dec. 15, 2021

(65) Prior Publication Data

US 2023/0184548 A1    Jun. 15, 2023

(51) Int. Cl.
*G01C 5/06* (2006.01)
*G01C 21/00* (2006.01)
*G06N 20/00* (2019.01)

(52) U.S. Cl.
CPC .............. *G01C 5/06* (2013.01); *G01C 21/383* (2020.08); *G01C 21/3859* (2020.08); *G06N 20/00* (2019.01)

(58) Field of Classification Search
None
See application file for complete search history.

(56) References Cited

U.S. PATENT DOCUMENTS

| | | | |
|---|---|---|---|
| 8,566,032 B2 | 10/2013 | Chowdhary et al. | |
| 9,939,264 B2 | 4/2018 | Barfield et al. | |
| 11,237,272 B2* | 2/2022 | Sevak | G01S 19/14 |

(Continued)

FOREIGN PATENT DOCUMENTS

| | | |
|---|---|---|
| EP | 3712638 A1 | 9/2020 |
| WO | WO 2019/228605 | 12/2019 |

OTHER PUBLICATIONS

Li et al., "Using Barometers to Determine the Height for Indoor Positioning", 2013 International Conference on Indoor Positioning and Indoor Navigation, (Oct. 28-31, 2013), 8 pages.

(Continued)

*Primary Examiner* — Lina Cordero
(74) *Attorney, Agent, or Firm* — Jason Wejnert; HERE GLOBAL B.V.

(57) ABSTRACT

The absolute altitude of multiple floors of a building are determined using a multi-mode learning process. Processor (s) execute application program code to cause an apparatus to operate in an initial floor learning mode that includes capturing outdoor altitude estimates for the apparatus and determining, based in part on the outdoor altitude estimates, instant altitude estimates for an initial floor of the building. An absolute altitude estimate for the initial floor is determined based one the instant altitude estimates. After the absolute altitude estimate for the initial floor satisfies a first threshold certainty, the apparatus operates in a subsequent floor learning mode configured for determining respective absolute altitudes for floors of the building based on the absolute altitude estimate for the initial floor and a priori floor height information for the building, a sensor-based altitude change estimate, and/or a determined floor height for the building.

20 Claims, 7 Drawing Sheets

(56) References Cited

U.S. PATENT DOCUMENTS

| | | | |
|---|---|---|---|
| 2018/0245916 A1* | 8/2018 | Ivanov | G01S 19/50 |
| 2019/0094379 A1* | 3/2019 | Chhokra | G01S 19/40 |
| 2020/0049832 A1* | 2/2020 | Sevak | G01C 5/06 |
| 2020/0249026 A1 | 8/2020 | Ivanov et al. | |
| 2021/0172736 A1 | 6/2021 | Ivanov et al. | |
| 2021/0400432 A1 | 12/2021 | Ivanov et al. | |

OTHER PUBLICATIONS

U.S. Appl. No. 17/477,744, filed Sep. 17, 2021, In re: Nurminen et al., entitled "Multi-Level Altitude Map Matching", 53 pages.

\* cited by examiner

MULTIPLE MODE LEARNING OF ABSOLUTE ALTITUDE OF FLOORS OF A BUILDING

TECHNOLOGICAL FIELD

An example embodiment relates generally to determining absolute altitude estimates for at least one floor and/or level of a building and/or venue. In particular, an example embodiment generally relates to generating, updating, and/or maintaining a digital map that includes an absolute altitude estimate for at least one floor and/or level of a building and/or venue.

BACKGROUND

A digital map that enables three-dimensional positioning includes information that may be used to generate an altitude estimate as part of a determined position estimate. Determining the altitude of indoor locations is complicated as global navigation satellite system (GNSS)-based position estimates are not available and/or reliable in indoor locations and conventional indoor positioning techniques are not configured to resolve an altitude estimate independent of information included in the employed positioning map.

BRIEF SUMMARY

Various embodiments provide methods, apparatus, systems, and computer program products for determining absolute altitude estimates for one or more floors and/or levels of a building and/or venue. In various embodiments, the absolute altitude estimates (referred to herein as altitude estimates) are provided and/or used to generate, update, and/or maintain a digital map configured to enable three-dimensional indoor positioning. In various embodiments, a mobile apparatus operates in an initial floor learning mode to determine and/or learn an altitude estimate for the initial floor and/or level. In various embodiments, while operating in the initial floor learning mode, the mobile apparatus is configured to only determine and/or learn an altitude estimate for the initial floor and/or level. In other words, altitude estimates for floors and/or levels other than the initial floor and/or level are not determined and/or learned during operation in the initial floor learning mode.

Once the altitude estimate for the initial floor and/or level is determined and/or learned to a confidence level and/or uncertainty level that satisfies a first threshold certainty, the operation of the mobile apparatus proceeds to a subsequent floor learning mode, in various embodiments. While operating in the subsequent floor learning mode, altitude estimates for one or more subsequent floors and/or levels within the building and/or venue (e.g., floors and/or levels within the building and/or venue that are not the initial floor) may be determined and/or learned. One or more respective altitude estimates for the initial floor and/or one or more subsequent floors may be provided for display (e.g., via a user interface); as input to a positioning algorithm (e.g., a hybrid positioning algorithm that uses motion data and position fixes); as input to a digital map generating, updating, and/or maintaining program and/or application; and/or the like.

In an example embodiment, the mobile apparatus captures radio observation data while operating in the initial floor learning mode and/or the subsequent floor learning mode. For example, the radio observation data characterize one or more radio nodes observed by the mobile apparatus. Instances of radio observation data are associated with respective position estimates indicating respective locations of the mobile apparatus when the mobile apparatus observed the respective radio nodes. For example, the position estimates include the altitude estimate for the respective floor and/or level of the building and/or venue that the mobile apparatus was located on when the respective radio node observations were captured. In an example embodiment, the radio observation data and the associated respective position estimates are used to generate, update, and/or maintain a digital map such as a radio map and/or positioning map that corresponds to at least a portion of the building and/or venue. In various embodiments, the digital map corresponds to multiple buildings and/or venues and/or outdoor areas between the multiple buildings and/or venues.

In an example embodiment, one or more processors execute application program code to cause a mobile apparatus to operate in an initial floor learning mode configured for determining an absolute altitude of an initial floor of the building. Operating in the initial floor learning mode comprises providing, via an interface of the mobile apparatus, an indication to perform one or more outdoor-indoor cycles to determine an absolute altitude estimate for the initial floor. Each respective outdoor-indoor cycle comprises capturing at least one outdoor altitude estimate for the mobile apparatus, and determining, based at least in part on the outdoor altitude estimate, an instant altitude estimate estimating an altitude of the initial floor. Operating in the initial floor learning mode further comprises determining an absolute altitude estimate for the initial floor based at least in part on one or more instant altitude estimates determined during the one or more outdoor-indoor cycles; and determining that the absolute altitude estimate for the initial floor satisfies a first threshold certainty. In various embodiments, responsive to determining that the absolute altitude estimate for the initial floor satisfies the first threshold certainty, the one or more processors execute the application program code to cause the mobile apparatus to operate in a subsequent floor learning mode. Operating in the subsequent floor learning mode comprises providing, via the interface, an indication to capture data corresponding to one or more subsequent floors of the building, and for each respective subsequent floor of the one or more subsequent floors receiving input via the interface indicating the respective subsequent floor, and based at least in part on the absolute altitude estimate for the initial floor and one or more of (a) a priori floor height information for the building, (b) a sensor-based altitude change estimate, or (c) a determined floor height for the building, determining an absolute altitude estimate for the respective subsequent floor.

According to a first aspect of the present disclosure, a method for determining an absolute altitude of one or more floors of a building is provided. In an example embodiment, the method comprises executing, by one or more processors of a mobile apparatus, application program code to cause the mobile apparatus to operate in an initial floor learning mode. Operating in the initial floor learning mode comprises providing, via an interface of the mobile apparatus, an indication to perform one or more outdoor-indoor cycles. Each respective outdoor-indoor cycle comprises capturing at least one outdoor altitude estimate for the mobile apparatus, and determining, based at least in part on the outdoor altitude estimate, an instant altitude estimate estimating for an initial floor of the building. Operating in the initial floor learning mode further comprises determining an absolute altitude estimate for the initial floor based at least in part on one or more instant altitude estimates determined during the one or more outdoor-indoor cycles; and determining that the absolute altitude estimate for the initial floor satisfies a first threshold certainty. In an example embodiment, the method further comprises, responsive to determining that the absolute altitude estimate for the initial floor satisfies the first threshold certainty, executing, by the one or more processors, the application program code to cause the mobile apparatus to operate in a subsequent floor learning mode. Operating in the subsequent floor learning mode comprises providing, via the interface, an indication to capture data corresponding to one or more subsequent floors of the building, and for each respective subsequent floor of the one or more subsequent floors receiving input via the interface indicating the respective subsequent floor, and based at least in part on the absolute altitude estimate for the initial floor and one or more of (a) a priori floor height information for the building, (b) a sensor-based altitude change estimate, or (c) a determined floor height for the building, determining an absolute altitude estimate for the respective subsequent floor.

In an example embodiment, the method further comprises at least one of (a) providing the absolute altitude estimate for at least one of (i) the initial floor or (ii) at least one of the one or more subsequent floors or (b) using the absolute altitude estimate for at least one of (i) the initial floor or (ii) at least one of the one or more subsequent floors to generate or update a digital map.

In an example embodiment, the digital map comprises building information for a plurality of buildings, the building information for each respective building comprises an absolute altitude estimate for at least one floor of the respective building.

In an example embodiment, the method further comprises prior to operating in the subsequent floor learning mode, executing the application program code to cause the mobile apparatus to operate in a secondary floor learning mode, wherein operating in the secondary floor learning mode causes the mobile apparatus to determine at least one of (a) an absolute altitude estimate for a secondary floor or (b) the determined floor height for the building; wherein the application program code is executed to cause the mobile apparatus to operate in the subsequent floor learning mode responsive to determining that the at least one of (a) the absolute altitude estimate of the secondary floor or (b) the determined floor height for the building satisfies a second threshold certainty.

In an example embodiment, the method further comprises providing an indication of a user-indicated floor and an absolute altitude estimate corresponding to the user-indicated floor as input to a positioning process configured to determine a position estimate for the mobile apparatus; and receiving the position estimate.

In an example embodiment, the sensor-based altitude change estimate is determined based at least in part on barometer data captured by a barometer of the mobile apparatus.

In an example embodiment, the method further comprises determining a respective absolute altitude estimate for one or more subsequent floors based on a detected floor change, the detected floor change detected based at least in part on at least one of (a) barometer data captured by a barometer of the mobile apparatus or (b) motion data captured by one or more motion sensors of the mobile apparatus.

In an example embodiment, operating in the subsequent floor learning mode further comprises determining whether the subsequent floor indicated by the user input indicating a respective subsequent floor is consistent with at least one of (a) one or more absolute altitude estimates for (i) the initial floor or (ii) for at least one of the one or more subsequent floors or (b) at least one of barometer data or motion data captured by respective sensors of the mobile apparatus; and when an inconsistency is determined, at least one of (a) providing an indication of the inconsistency via the interface or (b) not using the indication of user input indicating the respective subsequent floor in determining an absolute altitude estimate for the respective subsequent floor.

In an example embodiment, operating in the initial floor learning mode, an indication to perform an outdoor-indoor cycle is provided at least once every fifteen minutes.

In an example embodiment, the at least one outdoor altitude estimate for the mobile apparatus is captured responsive to determining that the mobile apparatus is located outdoors.

In an example embodiment, the one or more processors determine that the mobile apparatus is located outdoors based on at least one of user input received via the interface or sensor data captured by one or more sensors of the mobile apparatus.

In an example embodiment, providing the indication to capture data corresponding to the one or more subsequent floors comprises providing the indication to capture data without subsequent outdoor visits.

According to another aspect of the present disclosure, an apparatus (e.g., a mobile apparatus) is provided. In an example embodiment, the apparatus comprises at least one processor and at least one memory storing computer program code comprising initial floor learning mode program code and subsequent floor learning mode program code. The at least one memory and the computer program code are configured to, with the processor, cause the apparatus to at least execute the initial floor learning mode program code to cause the apparatus to operate in an initial floor learning mode. Operating in the initial floor learning mode comprises providing, via an interface of the apparatus, an indication to perform one or more outdoor-indoor cycles. Each respective outdoor-indoor cycle comprises capturing at least one outdoor altitude estimate for the mobile apparatus, and determining, based at least in part on the outdoor altitude estimate, an instant altitude estimate for an initial floor of the building. Operating in the initial floor learning mode further comprises determining an absolute altitude estimate for the initial floor based at least in part on one or more instant altitude estimates determined during the one or more outdoor-indoor cycles; and determining that the absolute altitude estimate for the initial floor satisfies a first threshold certainty. Responsive to determining that the absolute altitude estimate for the initial floor satisfies the first threshold certainty, the at least one memory and the computer program code are further configured to, with the processor, cause the apparatus to at least execute the subsequent floor learning program code to cause the apparatus to operate in a subsequent floor learning mode. Operating in the subsequent floor learning mode comprises providing, via the interface, an indication to capture data corresponding to one or more subsequent floors of the building, and for each respective subsequent floor of the one or more subsequent floors receiving input via the interface indicating the respective subsequent floor, and based at least in part on the absolute altitude estimate for the initial floor and one or more of (a) a priori floor height information for the building, (b) a sensor-based altitude change estimate, or (c) a determined floor height for the building, determining an absolute altitude estimate for the respective subsequent floor.

In an example embodiment, the at least one memory and the computer program code are further configured to, with the processor, cause the apparatus to at least perform at least one of: (a) providing the absolute altitude estimate for at least one of (i) the initial floor or (ii) at least one of the one or more subsequent floors or (b) using the absolute altitude estimate for at least one of (i) the initial floor or (ii) at least one of the one or more subsequent floors to generate or update a digital map.

In an example embodiment, the digital map comprises building information for a plurality of buildings, the building information for each respective building comprises an absolute altitude estimate for at least one floor of the respective building.

In an example embodiment, the at least one memory and the computer program code are further configured to, with the processor, cause the apparatus to at least, prior to operating in the subsequent floor learning mode, execute application program code to cause the apparatus to operate in a secondary floor learning mode, wherein operating in the secondary floor learning mode causes the apparatus to determine at least one of (a) an absolute altitude estimate for a secondary floor or (b) the determined floor height for the building; wherein the application program code is executed to cause the apparatus to operate in the subsequent floor learning mode responsive to determining that the at least one of (a) the absolute altitude estimate of the secondary floor or (b) the determined floor height for the building satisfies a second threshold certainty.

In an example embodiment, the at least one memory and the computer program code are further configured to, with the processor, cause the apparatus to at least provide an indication of a user-indicated floor and an absolute altitude estimate corresponding to the user-indicated floor as input to a positioning process configured to determine a position estimate for the apparatus; and receive the position estimate.

In an example embodiment, the sensor-based altitude change estimate is determined based at least in part on barometer data captured by a barometer of the apparatus.

In an example embodiment, the at least one memory and the computer program code are further configured to, with the processor, cause the apparatus to at least determine a respective absolute altitude estimate for one or more subsequent floors based on a detected floor change, the detected floor change detected based at least in part on at least one of (a) barometer data captured by a barometer of the apparatus or (b) motion data captured by one or more motion sensors of the apparatus.

In an example embodiment, operating in the subsequent floor learning mode further comprises determining whether the subsequent floor indicated by the user input indicating a respective subsequent floor is consistent with at least one of (a) one or more absolute altitude estimates for (i) the initial floor and (ii) one or more subsequent floors or (b) at least one of barometer data or motion data captured by respective sensors of the apparatus; and when an inconsistency is determined, at least one of (a) providing an indication of the inconsistency via the interface or (b) not using the indication of user input indicating the respective subsequent floor in determining an absolute altitude estimate for the respective subsequent floor.

In an example embodiment, operating in the initial floor learning mode, an indication to perform an outdoor-indoor cycle is provided at least once every fifteen minutes.

In an example embodiment, the at least one outdoor altitude estimate for the apparatus is captured responsive to determining that the apparatus is located outdoors.

In an example embodiment, the one or more processors determine that the mobile apparatus is located outdoors based on at least one of user input received via the interface or sensor data captured by one or more sensors of the apparatus.

In an example embodiment, providing the indication to capture data corresponding to the one or more subsequent floors comprises providing the indication to capture data without subsequent outdoor visits.

In still another aspect of the present disclosure, a computer program product is provided. In an example embodiment, the computer program product comprises at least one non-transitory computer-readable storage medium having computer-readable program code portions stored therein, wherein at least one of (a) the computer-readable program code portions comprise initial floor learning mode program code and subsequent floor learning mode program code or (b) a memory of an apparatus stores initial floor learning mode program code and subsequent floor learning mode program code. The computer-readable program code portions comprise executable portions configured, when executed by a processor of the apparatus, to cause the apparatus to execute the initial floor learning mode program code to cause the apparatus to operate in an initial floor learning mode. Operating in the initial floor learning mode comprises providing, via an interface of the apparatus, an indication to perform one or more outdoor-indoor cycles. Each respective outdoor-indoor cycle comprises capturing at least one outdoor altitude estimate for the apparatus, and determining, based at least in part on the outdoor altitude estimate, an instant altitude estimate for an initial floor of the building. Operating in the initial floor learning mode further comprises determining an absolute altitude estimate for the initial floor based at least in part on one or more instant altitude estimates determined during the one or more outdoor-indoor cycles; and determining that the absolute altitude estimate for the initial floor satisfies a first threshold certainty. The computer-readable program code portions comprise executable portions further configured, when executed by a processor of the apparatus, to cause the apparatus to, responsive to determining that the absolute altitude estimate for the initial floor satisfies the first threshold certainty, execute the subsequent floor learning program code to cause the apparatus to operate in a subsequent floor learning mode. Operating in the subsequent floor learning mode comprises providing, via the interface, an indication to capture data corresponding to one or more subsequent floors of the building, and for each respective subsequent floor of the one or more subsequent floors receiving input via the interface indicating the respective subsequent floor, and based at least in part on the absolute altitude estimate for the initial floor and one or more of (a) a priori floor height information for the building, (b) a sensor-based altitude change estimate, or (c) a determined floor height for the building, determining an absolute altitude estimate for the respective subsequent floor.

In an example embodiment, the computer-readable program code portions comprise executable portions further configured, when executed by a processor of the apparatus, to cause the apparatus to perform at least one of (a) providing the absolute altitude estimate for at least one of (i) the initial floor or (ii) at least one of the one or more subsequent floors or (b) using the absolute altitude estimate for at least one of (i) the initial floor or (ii) at least one of the one or more subsequent floors to generate or update a digital map.

In an example embodiment, the digital map comprises building information for a plurality of buildings, the building information for each respective building comprises an absolute altitude estimate for at least one floor of the respective building.

In an example embodiment, the computer-readable program code portions comprise executable portions further configured, when executed by a processor of the apparatus, to cause the apparatus to, prior to operating in the subsequent floor learning mode, execute application program code to cause the apparatus to operate in a secondary floor learning mode, wherein operating in the secondary floor learning mode causes the apparatus to determine at least one of (a) an absolute altitude estimate for a secondary floor or (b) the determined floor height for the building; wherein the application program code is executed to cause the apparatus to operate in the subsequent floor learning mode responsive to determining that the at least one of (a) the absolute altitude estimate of the secondary floor or (b) the determined floor height for the building satisfies a second threshold certainty.

In an example embodiment, the computer-readable program code portions comprise executable portions further configured, when executed by a processor of the apparatus, to cause the apparatus to provide an indication of a user-indicated floor and an absolute altitude estimate corresponding to the user-indicated floor as input to a positioning process configured to determine a position estimate for the apparatus; and receive the position estimate.

In an example embodiment, the sensor-based altitude change estimate is determined based at least in part on barometer data captured by a barometer of the apparatus.

In an example embodiment, the computer-readable program code portions comprise executable portions further configured, when executed by a processor of the apparatus, to cause the apparatus to determine a respective absolute altitude estimate for one or more subsequent floors based on a detected floor change, the detected floor change detected based at least in part on at least one of (a) barometer data captured by a barometer of the apparatus or (b) motion data captured by one or more motion sensors of the apparatus.

In an example embodiment, operating in the subsequent floor learning mode further comprises determining whether the subsequent floor indicated by the user input indicating the respective subsequent floor is consistent with at least one of (a) one or more absolute altitude estimates for (i) the initial floor and (ii) at least one of the one or more subsequent floors or (b) at least one of barometer data or motion data captured by respective sensors of the apparatus; and when an inconsistency is determined, at least one of (a) providing an indication of the inconsistency via the interface or (b) not using the indication of user input indicating the respective subsequent floor in determining the absolute altitude estimate for the respective subsequent floor.

In an example embodiment, operating in the initial floor learning mode, an indication to perform an outdoor-indoor cycle is provided at least once every fifteen minutes.

In an example embodiment, the at least one outdoor altitude estimate for the apparatus is captured responsive to determining that the apparatus is located outdoors.

In an example embodiment, the one or more processors determine that the apparatus is located outdoors based on at least one of user input received via the interface or sensor data captured by one or more sensors of the apparatus.

In an example embodiment, providing the indication to capture data corresponding to the one or more subsequent floors comprises providing the indication to capture data without subsequent outdoor visits.

According to yet another aspect of the present disclosure, an apparatus is provided. In an example embodiment, the apparatus comprises means for executing application program code to cause the apparatus to operate in an initial floor learning mode. Operating in the initial floor learning mode comprises providing, via an interface of the apparatus, an indication to perform one or more outdoor-indoor cycles. Each respective outdoor-indoor cycle comprises capturing at least one outdoor altitude estimate for the apparatus, and determining, based at least in part on the outdoor altitude estimate, an instant altitude estimate for an initial floor of the building. Operating in the initial floor learning mode further comprises determining an absolute altitude estimate for the initial floor based at least in part on one or more instant altitude estimates determined during the one or more outdoor-indoor cycles; and determining that the absolute altitude estimate for the initial floor satisfies a first threshold certainty. The apparatus comprises means for, responsive to determining that the absolute altitude estimate for the initial floor satisfies the first threshold certainty, executing the application program code to cause the apparatus to operate in a subsequent floor learning mode. Operating in the subsequent floor learning mode comprises providing, via the interface, an indication to capture data corresponding to one or more subsequent floors of the building, and for each respective subsequent floor of the one or more subsequent floors receiving input via the interface indicating the respective subsequent floor, and based at least in part on the absolute altitude estimate for the initial floor and one or more of (a) a priori floor height information for the building, (b) a sensor-based altitude change estimate, or (c) a determined floor height for the building, determining an absolute altitude estimate for the respective subsequent floor.

BRIEF DESCRIPTION OF THE DRAWINGS

Figure 1:
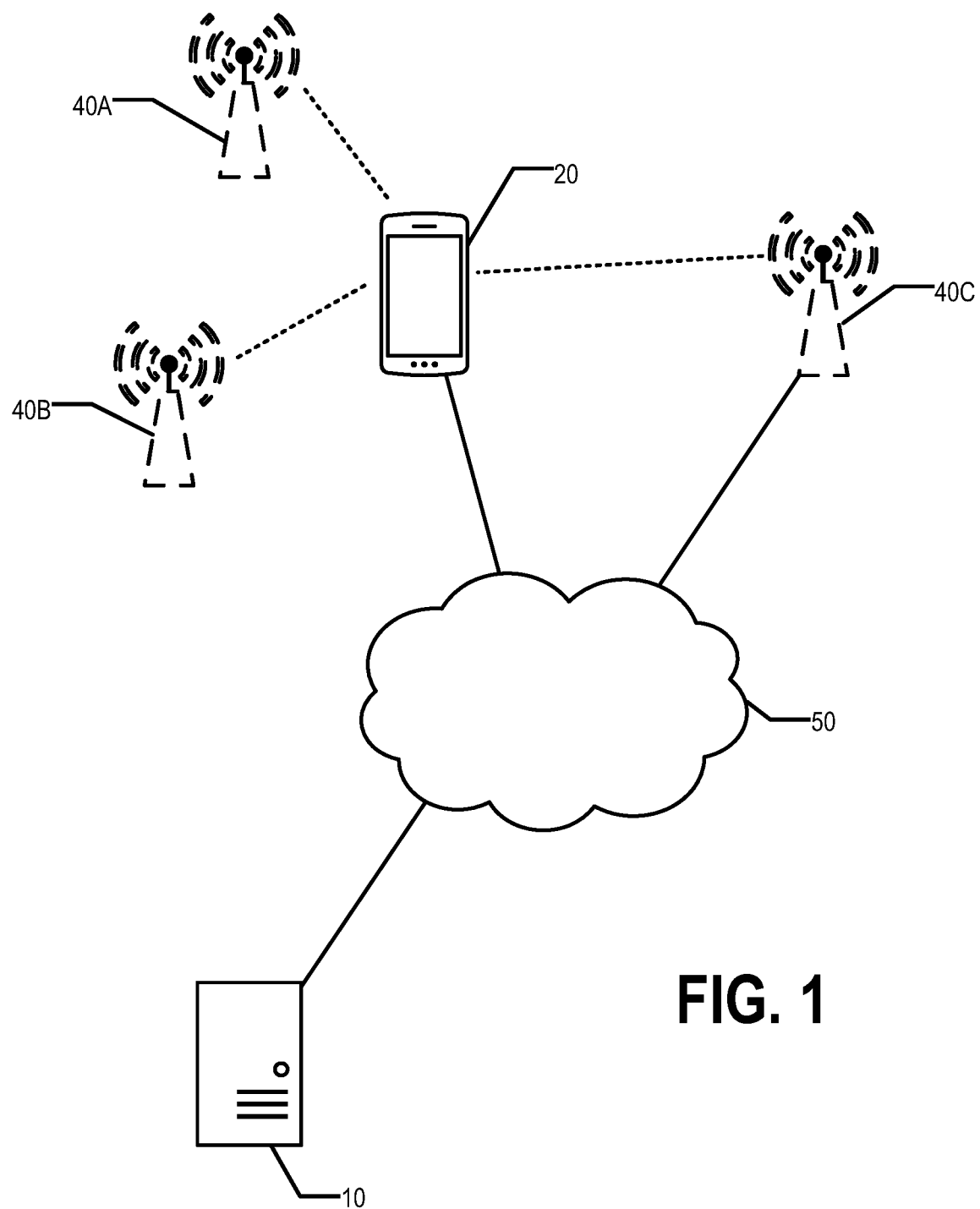
Figure 2A:
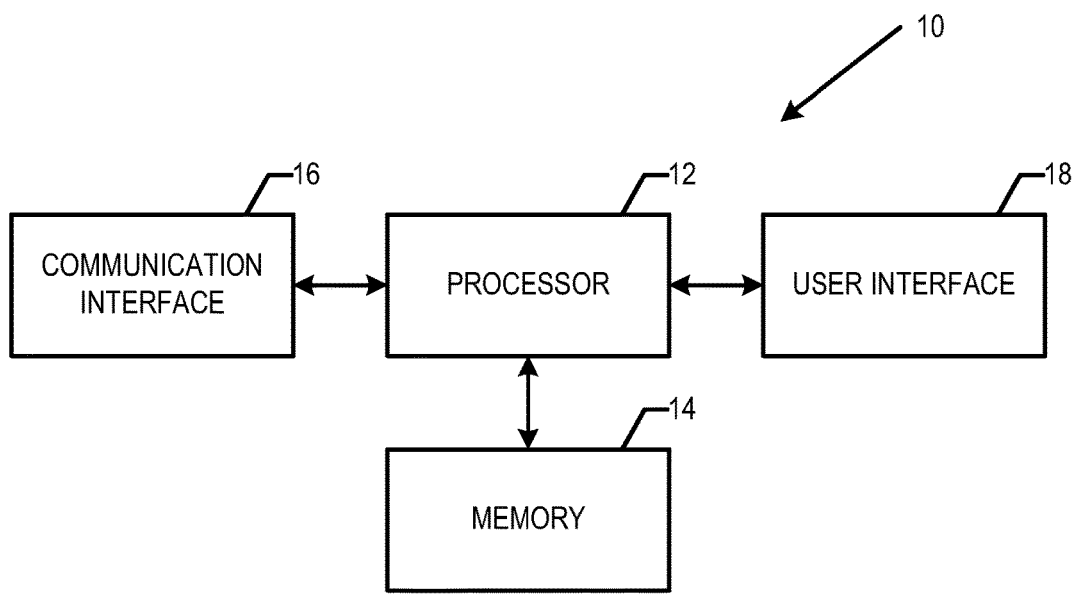
Figure 2B:
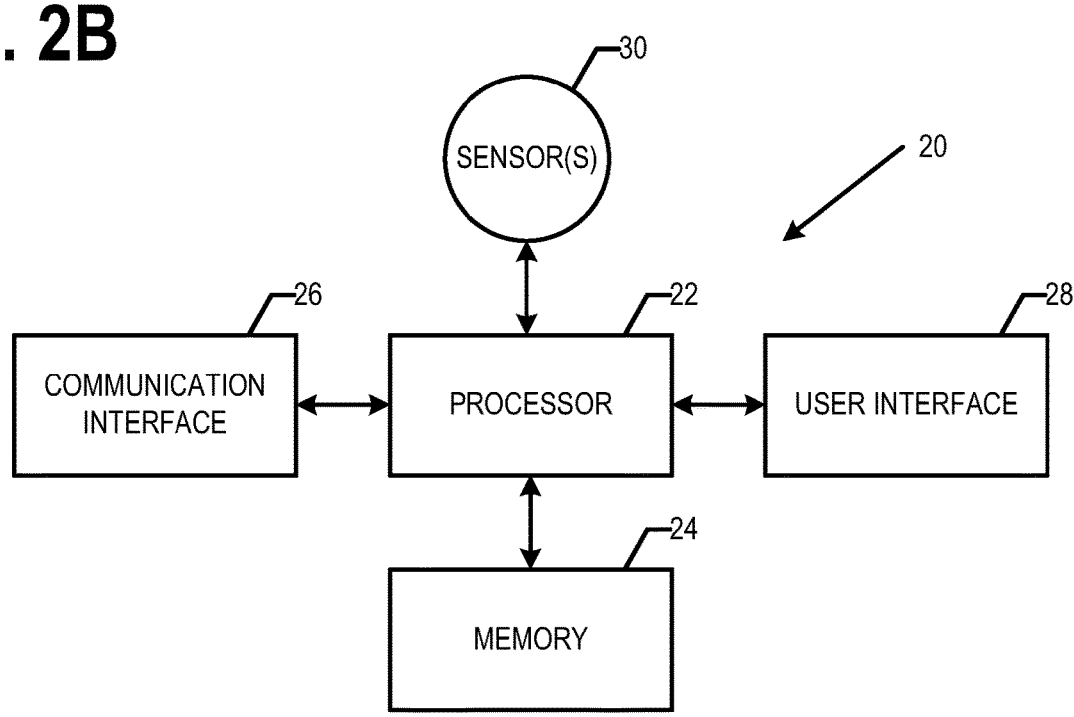
Figure 3:
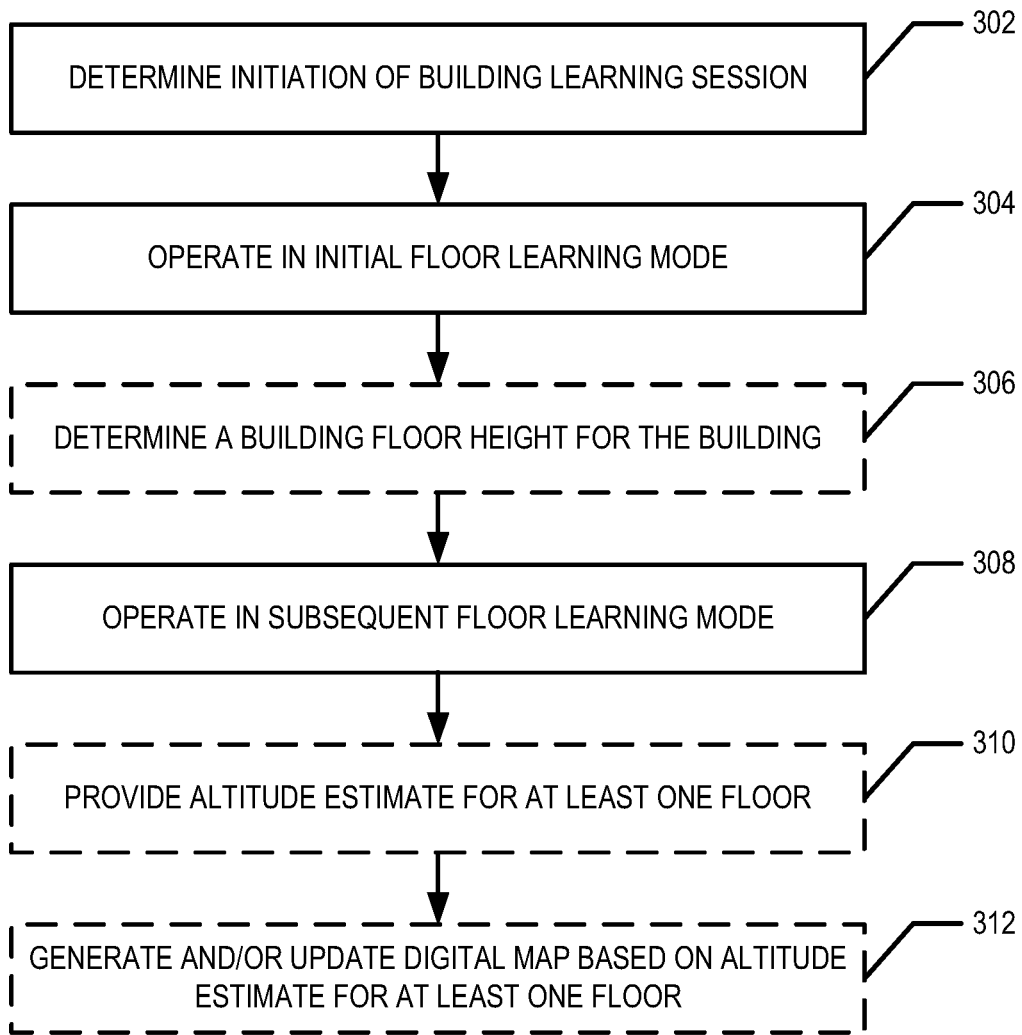
Figure 4:
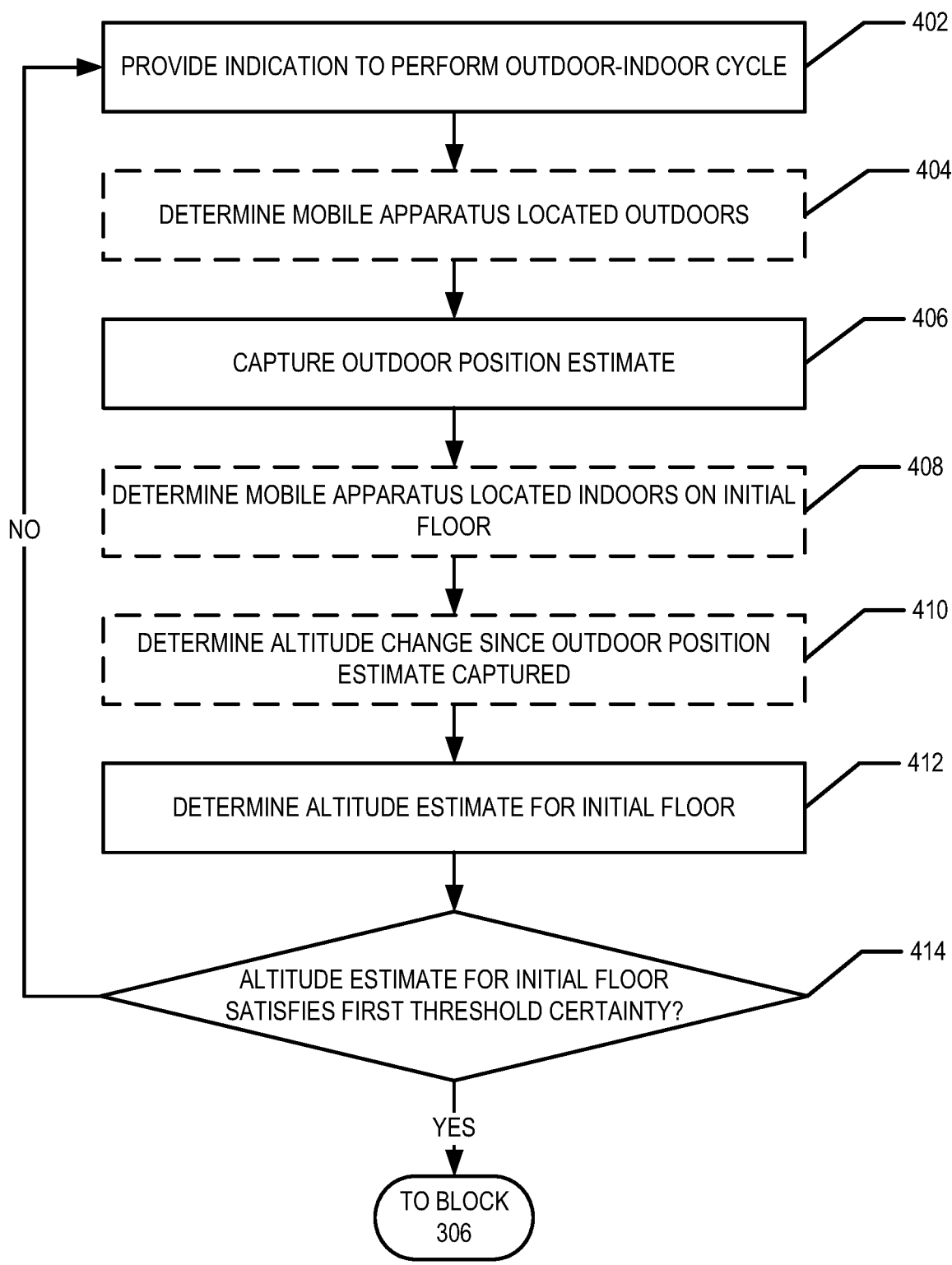
Figure 5:
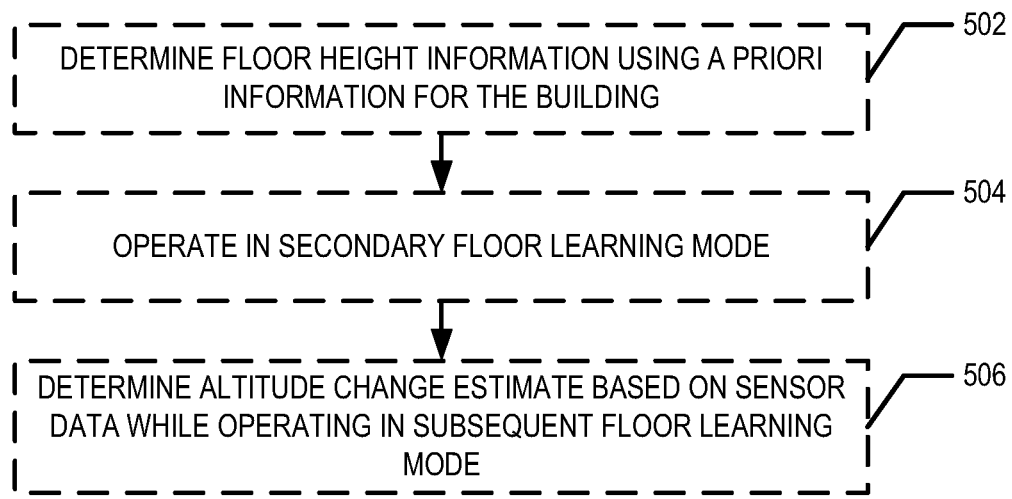
Figure 6:
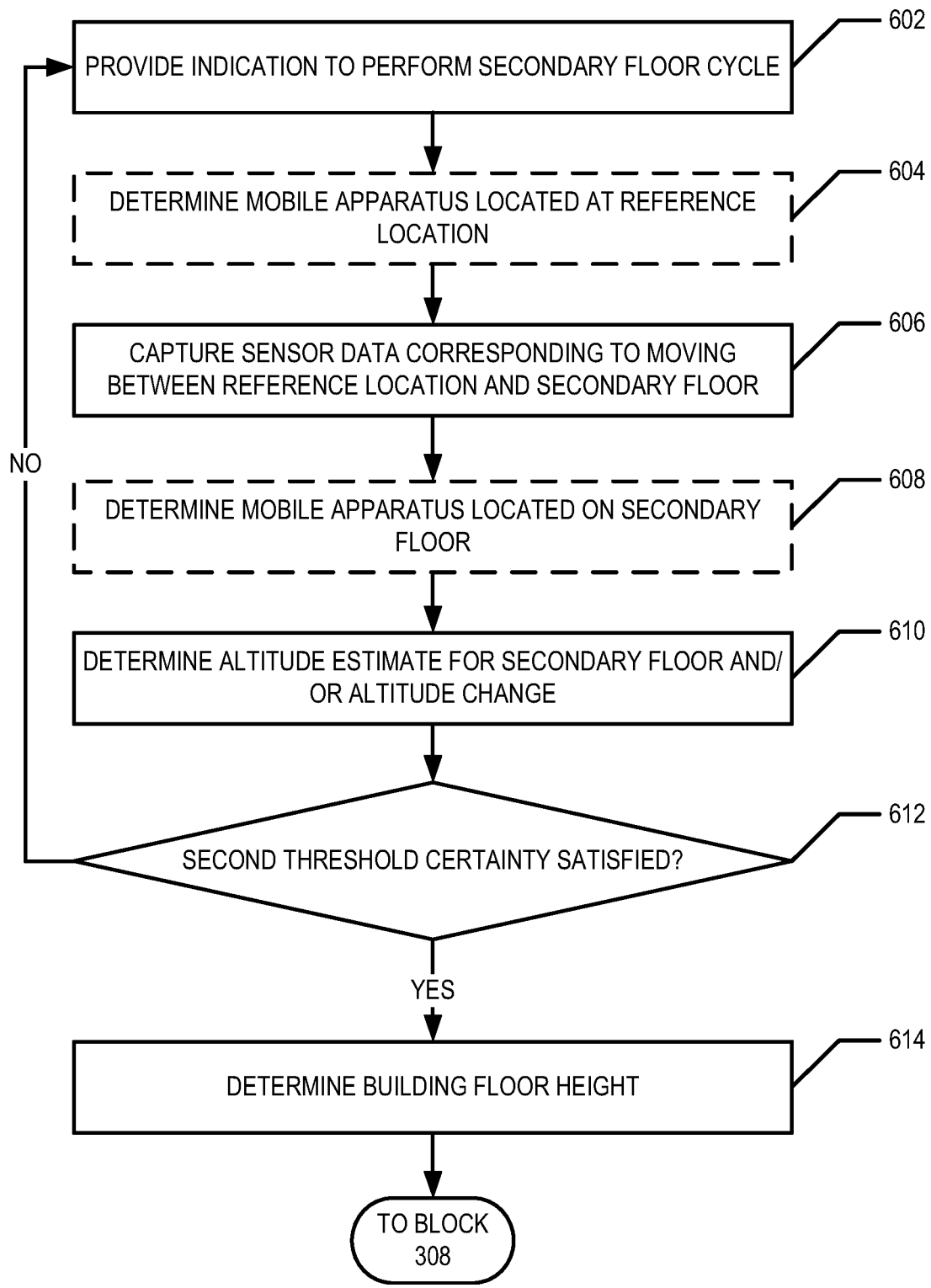
Figure 7:
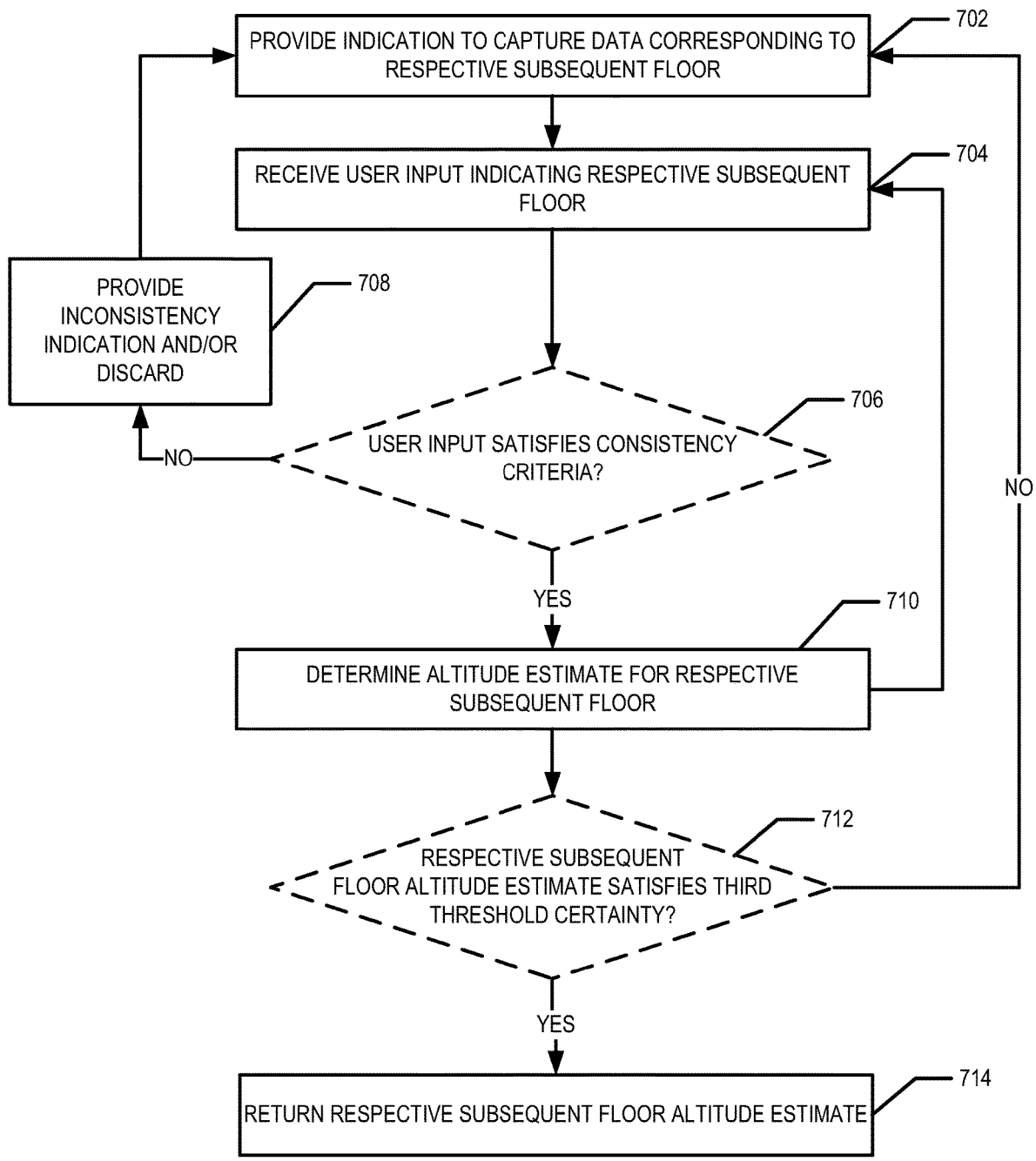

Having thus described certain example embodiments in general terms, reference will hereinafter be made to the accompanying drawings, which are not necessarily drawn to scale, and wherein:

FIG. 1 is a block diagram showing an example system of one embodiment of the present disclosure;

FIG. 2A is a block diagram of a network apparatus that may be specifically configured in accordance with an example embodiment;

FIG. 2B is a block diagram of a mobile apparatus that may be specifically configured in accordance with an example embodiment;

FIG. 3 is a flowchart illustrating operations performed, such as by the mobile apparatus of FIG. 2B, to determine and/or provide altitude estimates for one or more floors and/or levels of a building and/or venue, in accordance with an example embodiment;

FIG. 4 is a flowchart illustrating operations performed, such as by the mobile apparatus of FIG. 2B, to operate in an initial floor learning mode, in accordance with an example embodiment;

FIG. 5 is a flowchart illustrating operations performed, such as by the mobile apparatus of FIG. 2B, to determine a building floor height for the building and/or venue, in accordance with an example embodiment;

FIG. 6 is a flowchart illustrating operations performed, such as by the mobile apparatus of FIG. 2B, to operate in a secondary floor learning mode, in accordance with an example embodiment; and FIG. 7 is a flowchart illustrating operations performed, such as by the mobile apparatus of FIG. 2B, to operate in a subsequent floor learning mode, in accordance with an example embodiment.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. Like reference numerals refer to like elements throughout. As used herein, the terms "data," "content," "information," and similar terms may be used interchangeably to refer to data capable of being transmitted, received and/or stored in accordance with embodiments of the present invention. As used herein, the terms "substantially" and "approximately" refer to values and/or tolerances that are within manufacturing and/or engineering guidelines and/or limits. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware.

I. General Overview

Various embodiments provide methods, apparatus, systems, and computer program products for determining absolute altitude estimates for one or more floors and/or levels of a building and/or venue. In various embodiments, the absolute altitude estimates (referred to herein as altitude estimates) are provided and/or used to generate, update, and/or maintain a digital map configured to enable three-dimensional indoor positioning. In various embodiments, a mobile apparatus operates in an initial floor learning mode to determine and/or learn an altitude estimate for the initial floor and/or level. In various embodiments, while operating in the initial floor learning mode, the mobile apparatus is configured to only determine and/or learn an altitude estimate for the initial floor and/or level. In other words, altitude estimates for floors and/or levels other than the initial floor and/or level are not determined and/or learned during operation in the initial floor learning mode.

During operation in the initial floor learning mode, the mobile apparatus provides indications and/or user instructions (e.g., via a user interface of the mobile apparatus) to perform one or more outdoor-indoor cycles. During an outdoor-indoor cycle, the mobile apparatus is moved (e.g., by the user) out-of-doors (e.g., outside of the building and/or venue) and a GNSS-based outdoor position estimate that includes an altitude estimate is determined. The mobile apparatus is then moved (e.g., by the user) indoors to one or more locations on the initial floor and/or level (e.g., inside of the building and/or venue). In an example embodiment, the initial floor and/or level is a ground floor and/or level, a subterranean and/or basement floor and/or level, or an elevated floor and/or level (e.g., above ground floor). Based on the outdoor position estimates and sensor data captured by one or more sensors of the mobile apparatus, altitude estimates for the one or more locations on the initial floor and/or level are determined and/or generated. An altitude estimate for the initial floor and/or level is determined and/or generated based on the altitude estimates determined and/or generated for the one or more locations on the initial floor and/or level (e.g., based on an assumption that the one or more locations on the initial floor and/or level at generally the same altitude).

Once the altitude estimate for the initial floor and/or level is determined and/or learned to a confidence level and/or uncertainty level that satisfies a first threshold certainty, the operation of the mobile apparatus proceeds to a subsequent floor learning mode, in various embodiments. While operating in the subsequent floor learning mode, altitude estimates for one or more subsequent floors and/or levels within the building and/or venue (e.g., floors and/or levels within the building and/or venue that are not the initial floor) may be determined and/or learned. For example, in an example embodiment, the mobile apparatus may be moved and/or carried (e.g., by a user) to a subsequent floor and/or level in the building and/or venue (e.g., a floor and/or level within the building and/or venue that is not the initial floor and/or level). The mobile apparatus may receive input (e.g., via a user interface thereof) indicating which subsequent floor and/or level the mobile apparatus is located on, a relationship between the subsequent floor and/or level that the mobile apparatus is located on and the initial floor, and/or the like. Based on at least one of a sensor-based altitude change estimate (e.g., with respect to when the mobile apparatus was located on the initial floor and/or level and/or another subsequent floor and/or level for which an altitude estimate has been determined and/or generated), a priori floor height information for the building and/or venue (e.g., detailing the ceiling height and/or other height information corresponding to the floors and/or levels of the building and/or venue), and/or a determined floor height for the building, the altitude estimate for the subsequent floor is determined and/or generated.

One or more respective altitude estimates for the initial floor and/or level and/or one or more subsequent floors and/or levels may be provided for display (e.g., via a user interface); as input to a positioning algorithm (e.g., a hybrid positioning algorithm that uses motion data and position fixes); as input to a digital map generating, updating, and/or maintaining program and/or application; and/or the like, in various embodiments.

In an example embodiment, the mobile apparatus captures radio observation data while operating in the initial floor learning mode and/or the subsequent floor learning mode. For example, the radio observation data characterize one or more radio nodes observed by the mobile apparatus. Instances of radio observation data are associated with respective position estimates indicating respective locations of the mobile apparatus when the mobile apparatus observed the respective radio nodes. For example, the position estimates include the altitude estimate for the respective floor and/or level of the building and/or venue that the mobile apparatus was located on when the respective radio node observations were captured. In an example embodiment, the radio observation data and the associated respective position estimates are used to generate, update, and/or maintain a digital map such as a radio map and/or positioning map that corresponds to at least a portion of the building and/or venue. In various embodiments, the digital map corresponds to multiple buildings and/or venues and/or outdoor areas between the multiple buildings and/or venues.

Conventionally, indoor positioning techniques do not allow for the determination of an altitude estimate for an indoor position unless altitude information for the building and/or venue in question is already provided by the employed positioning map. For example, as GNSS-based position estimates are not available and/or not reliable for indoor positioning, determining the absolute altitude of a floor and/or level of a building and/or venue and/or generating positioning maps that include absolute altitude information for floors and/or levels of buildings and/or venues are technical problems in the field of indoor positioning.

Various embodiments provide technical solutions to such technical problems. In particular, operating in the initial floor learning mode enables the mobile apparatus to determine and/or generate an accurate altitude estimate for the initial floor and/or level of the building and/or venue efficiently. The altitude estimate for the initial floor and/or level of the building and/or venue can then be used as an altitude fix while determining altitude estimates for various subsequent floors and/or levels of the building and/or venue. The determined altitude estimates may then be displayed; stored for future use; provide as input to a positioning algorithm; used to generate, update, and/or maintain a digital map; and/or the like. Thus, various embodiments provide an improvement to the field of indoor positioning by enabling performance of three dimensional indoor positioning (e.g., determining an indoor position estimate that includes absolute altitude in addition to a horizontal position).

In an example embodiment, radio observation data is captured while the mobile apparatus is operating in the initial floor learning mode and/or the subsequent floor learning mode. The radio observation data may be used to generate, update, and/or maintain a radio map and/or positioning map for use in radio-based positioning of a geographical area that includes at least a portion of the building and/or venue. Thus, various embodiments enable the simultaneous learning and/or determining of the radio environment within at least a portion of the building and/or venue and the determining and/or generating of altitude estimates for one or more floors and/or levels within the building and/or venue. As such, various embodiments provide further improvements to the technical field of indoor positioning and radio/positioning map generation and/or maintenance.

II. Example System Architecture

FIG. 1 provides an illustration of an example system that can be used in conjunction with various embodiments of the present invention. As shown in FIG. 1, the system may include one or more network apparatus 10, one or more mobile apparatus 20, one or more networks 50, and/or the like. In various embodiments, the system may further include one or more radio nodes 40 (e.g., 40A, 40B, 40C). In various embodiments, the mobile apparatus 20 is a mobile computing device, a mobile data gathering platform, IoT device, and/or the like. In various embodiments, the mobile apparatus 20 is a smartphone, tablet, personal digital assistant (PDA), navigation device, personal computer, client device, laptop, mobile computing device, IoT device, and/or the like. In general, an IoT device is a mechanical and/or digital device configured to communicate with one or more computing devices and/or other IoT devices via one or more wired and/or wireless networks 50. In an example embodiment, the network apparatus 10 is a server, group of servers, distributed computing system, Cloud-based computing resource, and/or other computing system. For example, the network apparatus 10 may be in communication with one or more mobile apparatuses 20 and/or the like via one or more wired or wireless networks 50. In various embodiments, the radio nodes 40 may be wireless network access points; Wi-Fi devices, network access points, and/or beacons; Bluetooth devices, network access points, and/or beacons; cellular network access points; and/or devices disposed within the building and/or venue and configured to emit, transmit, generate, and/or broadcast radio frequency signals.

In an example embodiment, a network apparatus 10 may comprise components similar to those shown in the example network apparatus 10 diagrammed in FIG. 2A. In an example embodiment, the network apparatus 10 is configured to receive altitude estimates for one or more floors and/or levels of one or more respective buildings and/or venues; receive radio observation data and associated position estimates; generate, update, and/or maintain one or more digital maps based on the received altitude estimates and/or radio observation data and associated position estimates; and/or the like. For example, as shown in FIG. 2A, the network apparatus 10 may comprise a processor 12, memory 14, a user interface 18, a communications interface 16, and/or other components configured to perform various operations, procedures, functions or the like described herein. In various embodiments, the network apparatus 10 stores a geographical database and/or positioning map such as a radio map corresponding to geographic area that includes at least a portion of a building and/or venue (e.g., in memory 14). In at least some example embodiments, the memory 14 is non-transitory.

In an example embodiment, a mobile apparatus 20 is a mobile computing entity, IoT device, and/or the like. In an example embodiment, the mobile apparatus 20 may be configured to operate in an initial floor learning mode to perform outdoor-indoor cycles to capture outdoor position estimates and determine altitude estimates for the initial floor and/or level of the building and/or venue; operate in a subsequent floor learning mode to determine altitude estimates for one or more subsequent floors and/or levels of the building and/or venue based at least in part on the altitude estimate for the initial floor and/or level of the building; generate and/or capture radio observation data and associate respective position estimates therewith; provide altitude estimates of one or more floors and/or levels of the building and/or venue and/or radio observation data and associate respective position estimates; and/or the like. In an example embodiment, as shown in FIG. 2B, the mobile apparatus 20 may comprise a processor 22, memory 24, a communications interface 26, a user interface 28, one or more sensors 30 and/or other components configured to perform various operations, procedures, functions or the like described herein. In various embodiments, the mobile apparatus 20 stores at least a portion of one or more digital maps (e.g., geographic databases, positioning maps such as a radio map corresponding to at least a portion of a building and/or venue, and/or the like) and/or computer executable instructions configured to cause the mobile apparatus 20 to operate in an initial floor learning mode and/or subsequent floor learning mode in memory 24. In at least some example embodiments, the memory 24 is non-transitory.

In various embodiments, the sensors 30 comprise one or more location sensors such as a GNSS sensor, inertial measurement unit (IMU) and/or motion sensors (e.g., accelerometers, gyroscopes, magnetometers, and/or the like), altimeters, and/or the like. In various embodiments, the sensors 30 comprise one or more image sensors configured to capture visual samples, such as digital camera(s), 3D cameras, 360° cameras, and/or image sensors. In various embodiments, the sensors 30 comprise one or more audio sensors configured to capture audio samples, such as a microphone and/or other audio sensor. In an example embodiment, the one or more sensors 30 comprise one or more environmental sensors such as barometers, thermometers, humidity sensors, and/or the like. In various embodiments, the one or more sensors 30 may comprise one or more interfaces, such as radio interfaces, configured to observe and/or receive (radio frequency) signals generated and/or transmitted by one or more access points and/or radio nodes 40. For example, the one or more interfaces may be configured (possibly in coordination with processor 22) to determine a radio node identifier configured to identify the radio node 40 that generated and/or transmitted a signal observed by the mobile apparatus 20, a signal strength of the signal observed by the mobile apparatus 20, a one-way or round-trip-time value for a signal observed by the mobile apparatus 20, and/or the like. As used herein, when a mobile apparatus 20 observes radio node 40, the mobile apparatus 20 has observed a (radio frequency) signal emitted, broadcast, generated, and/or transmitted by the radio node 40. In an example embodiment, the interface may be configured to observe one or more types of signals such as generated and/or transmitted in accordance with one or more protocols such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. For example, the interface may be configured to observe signals of one or more modern global cellular formats such as GSM, WCDMA, TD-SCDMA, LTE, LTE-A, CDMA, NB-IOT and/or non-cellular formats such as WLAN, Bluetooth, Bluetooth Low Energy (BLE), Zigbee, Lora, and/or the like. For example, the interface may be configured to observe radio, millimeter, microwave, and/or infrared wavelength signals. In an example embodiment, the interface may be coupled to and/or part of a communications interface 26. In various embodiments, the sensors 30 may comprise various other sensors such as two dimensional (2D) and/or three dimensional (3D) light detection and ranging (LiDAR)(s), long, medium, and/or short range radio detection and ranging (RADAR), ultrasonic sensors, electromagnetic sensors, (near-) infrared (IR) cameras, and/or the like.

Each of the components of the system may be in electronic communication with, for example, one another over the same or different wireless or wired networks 50 including, for example, a wired or wireless Personal Area Network (PAN), Local Area Network (LAN), Metropolitan Area Network (MAN), Wide Area Network (WAN), cellular network, and/or the like. In an example embodiment, a network 50 comprises the automotive cloud, digital transportation infrastructure (DTI), radio data system (RDS)/high definition (HD) radio or other digital radio system, and/or the like.

For example, a mobile apparatus 20 may be in communication with a network apparatus 10 via the network 50. For example, a mobile apparatus 20 may communicate with the network apparatus 10 via a network, such as the Cloud. For example, the Cloud may be a computer network that provides shared computer processing resources and data to computers and other devices connected thereto. For example, the mobile apparatus 20 may be configured to provide floor estimates for one or more floors and/or levels of one or more respective buildings and/or venues and/or provide instances of radio observation data associated with respective position estimates including respective altitude estimates via the network 50. For example, a mobile apparatus 20 may be configured to receive at least a portion of a digital map such as a radio map and/or positioning map configured for use in one or more positioning and/or navigation-related functions via the network 50. For example, the network apparatus 10 may be configured to receive floor estimates for one or more floors and/or levels of one or more respective buildings and/or venues and/or provide instances of radio observation data associated with respective position estimates including respective altitude estimates and/or provide at least a portion of a digital map such as a radio map and/or positioning map configured for use in one or more positioning and/or navigation-related functions via the network 50. In various embodiments, one or more radio nodes 40 are wireless access points that enable the mobile apparatus 20 to communicate via the network 50.

Certain example embodiments of the network apparatus 10 and/or mobile apparatus 20 are described in more detail below with respect to FIGS. 2A and 2B.

III. Example Operation(s)

In various embodiments, a mobile apparatus 20 is configured to serially operate in an initial floor learning mode to determine and/or generate an altitude estimate for an initial floor and/or level of a building and/or venue and then to operate in a subsequent floor learning mode to determine and/or generate respective altitude estimates for one or more subsequent floors and/or levels of the building and/or venue. The determined altitude estimates may then be displayed; stored for future use; provide as input to a positioning algorithm; used to generate, update, and/or maintain a digital map; and/or the like. Thus, various embodiments provide an improvement to the field of indoor positioning by enabling performance of three dimensional indoor positioning (e.g., determining an indoor position estimate that includes absolute altitude in addition to a horizontal position).

In an example embodiment, the mobile apparatus 20 is further configured to capture instances of radio observation data while the mobile apparatus 20 is operating in the initial floor learning mode and/or the subsequent floor learning mode and associate respective position estimates therewith. The position estimates include respective altitude estimates determined by execution of the initial floor learning mode and/or the subsequent floor learning mode.

In various embodiments, the mobile apparatus 20 is configured to provide one or more altitude estimates for one or more respective floors and/or levels of the building and/or venue; provide the instances of radio observation data and the respective position estimates associated therewith; generate, update, and/or maintain a digital map based at least in part on the one or more altitude estimates and/or instances of radio observation and the respective position estimates associated therewith.

FIG. 3 provides a flowchart illustrating various processes, procedures, operations, and/or the like for determining and/or providing one or more floor altitude estimates for a respective one or more floors and/or levels of the building and/or venue. Starting at block 302, the mobile apparatus 20 determines initiation of a building learning session. For example, the mobile apparatus 20 comprises means, such as processor 22, memory 24, user interface 18, and/or the like for determining initiation of a building learning session. For example, a user may interact with the user interface 18 to cause a building learning application to be opened on the mobile apparatus 20, cause execution of a building learning program by the processor 22, and/or the like.

At block 304, the mobile apparatus 20 operates in the initial floor learning mode. For example, the mobile apparatus 20 comprises means, such as processor 22, memory 24, user interface 28, sensors 30, and/or the like, for operating in the initial floor learning mode. In various embodiments, the initial floor and/or level of the building and/or venue is a ground floor and/or level, a subterranean and/or basement floor and/or level, an elevated (e.g., above ground) floor and/or level, and/or a floor and/or level that includes outdoor access (e.g., to a deck, porch, balcony, ground, and/or the like).

While operating in the initial floor learning mode, the mobile apparatus 20 provides indications and/or user instructions (e.g., via user interface 28) that the mobile apparatus 20 should be moved and/or carried (e.g., by a user) outdoors. While outdoors, the mobile apparatus 20 captures a GNSS-based position estimate that includes an outdoor altitude estimate. The mobile apparatus 20 is then moved and/or carried (e.g., by the user) indoors to the initial floor and/or level of the building and/or venue. Based a detected change in altitude (e.g., based on sensor data captured by one or more sensors 30 of the mobile apparatus 20) between when the mobile apparatus 20 was located outdoors (e.g., outside of the building and/or venue) and when the mobile apparatus 20 was located indoors on the initial floor and/or level, an instant altitude estimate for the initial floor and/or level is determined and/or generated. In an example embodiment, a plurality of outdoor-indoor cycles are performed resulting in a plurality of instant altitude estimates being determined for the initial floor and/or level. The instant altitude estimates are aggregated (e.g., after determination/generation of a plurality of instance altitude estimates and/or as each instant altitude estimate is determined/generated) to determine an altitude estimate for the initial floor and/or level of the building and/or venue. When the altitude estimate for the initial floor and/or level of the building and/or venue satisfies a first threshold certainty (e.g., a confidence level for the altitude estimate reaches a minimum confidence level) the mobile apparatus 20 may transition out of the initial floor learning mode.

At block 306, the mobile apparatus 20 determines and/or obtains a building floor height for the building and/or venue. For example, the mobile apparatus 20 comprises means, such as processor 22, memory 24, communications interface 26, user interface 28, and/or the like, for determining and/or obtaining a building floor height for the building and/or venue. In an example embodiment, the mobile apparatus access and/or obtains (e.g., from the network apparatus 10 via network 50) a building floor height for the building and/or venue based on a priori information for the building and/or venue. For example, accessible information for the building and/or venue (e.g., available as part of public records, a digital map, and/or another data source accessible to the network apparatus 10 and/or mobile apparatus 20) may be accessed (e.g., requested and/or received via an appropriate application program interface (API) and/or the like) to determine and/or obtain a building floor height for the building and/or venue. In another example, the mobile apparatus 20 may operate in a secondary floor learning mode to determine an altitude estimate for a secondary floor and/or determine an altitude difference between the initial floor and the secondary floor that can be used to determine a building floor height for the building and/or venue. For example, the mobile apparatus 20 may be moved and/or carried between the initial floor and/or level and a secondary floor and/or level of the building and/or venue. In various embodiments, the secondary floor is an adjacent floor and/or level of the building and/or venue with respect to the initial floor and/or level (e.g., no other floors or levels are located between the initial floor and/or level of the building and/or venue). In an example embodiment, one or more floors and/or levels of the building and/or venue are disposed between the initial floor and/or level and the secondary floor and/or level. In various embodiments, the mobile apparatus 20 determines a sensor-based altitude change and/or difference estimate between various floors (e.g., the initial floor and/or level and a particular subsequent floor and/or level) based on sensor data (e.g., acceleration data, barometric pressure data, and/or the like) captured by one or more sensors 30 of the mobile apparatus 20 during the operation of the subsequent floor learning mode.

At block 308, the mobile apparatus 20 operates in the subsequent floor learning mode. For example, the mobile apparatus 20 comprises means, such as processor 22, memory 24, user interface 28, and/or the like, for operating in the subsequent floor learning mode. For example, in the subsequent floor learning mode, indications and/or user instructions are provided (e.g., via user interface 28) for the mobile apparatus 20 to be moved and/or carried (e.g., by the user) to one or more subsequent floors and/or levels. In various embodiments, when the mobile apparatus 20 is located on a particular subsequent floor and/or level, the user may interact with the user interface 28 to provide user input indicating that the mobile apparatus 20 is located on the particular floor and/or level. In various embodiments, an altitude estimate for the particular subsequent floor and/or level is then determined based at least in part on the altitude estimate for the initial floor and a priori floor height information for the building, a sensor-based altitude change estimate, a determined floor height for the building, and/or another estimate for the building floor height and/or altitude change between various floors and/or levels of the building and/or venue. In various embodiments multiple altitude estimates are determined for a particular subsequent floor and/or level and then aggregated to determine and/or generate the altitude estimate for the particular subsequent floor and/or level. In various embodiments, the mobile apparatus 20 continues to operate in the subsequent floor learning mode until altitude estimates are determined for each of the subsequent floors and/or levels and/or a subset of the subsequent floors and/or levels of the building and/or venue; until altitude estimates that each satisfy a third threshold certainty are determined for each of the subsequent floors and/or levels and/or a subset of the subsequent floors and/or levels of the building and/or venue; until user input causing the ending of the operation in the subsequent floor mode is received, and/or the like.

In various embodiments, during the initial floor learning mode, secondary floor learning mode, and/or subsequent floor learning mode, the mobile apparatus 20 may capture and/or generate instances of radio observation data that are associated with respective three-dimensional position estimates that indicate and/or approximate the location where the respective instance of radio observation data was captured and/or generated. In various embodiments, an instance of radio observation data comprises one or more radio node identifiers, each configured to identify a respective radio node observed by the mobile apparatus 20 at a particular location. The instance of radio observation data further comprises respective observation characteristics that characterize the mobile apparatus's 20 observation of each respective radio node 40 identified by a respective one of the one or more radio node identifiers. In various embodiments, the observation characteristics that characterize the mobile apparatus's 20 observation of respective radio node 40 include one or more of a signal strength indicator indicating the observed signal strength, a timing parameter (e.g., one-way time, round-trip-time, timing advance value, and/or the like), a frequency (band) or channel, and/or the like.

Each instance of radio observation data is associated with a respective three-dimensional position estimate corresponding to the respective particular location where the mobile apparatus 20 performed the observations characterized by the instance of radio observation data. For example, a respective three-dimensional position estimate comprises an altitude estimate corresponding to the floor and/or level of the building and/or venue the mobile apparatus 20 was located on when the mobile apparatus 20 performed the observations characterized by the instance of radio observation data. In an example embodiment, when an instance of radio observation data is captured and/or generated a respective position estimate is generated that includes a floor and/or level index and/or identifier (e.g., possibly determined based on received user input indicating on which floor and/or level the mobile apparatus 20 is located) and a respective altitude estimate is added to and/or associated with the respective position estimate once an altitude estimate corresponding to the floor and/or level indicated by the floor and/or level index and/or identifier of the respective position estimate is generated and/or determined.

At block 310, the mobile apparatus 20 provides respective altitude estimates for the initial floor and/or level and/or one or more subsequent floors and/or levels. For example, the mobile apparatus 20 comprises means, such as processor 22, memory 24, communication interface 26, user interface 28, and/or the like, for providing the respective altitude estimates for the initial floor and/or level and/or one or more subsequent floors and/or levels. For example, the respective altitude estimates for the initial floor and/or level and/or one or more subsequent floors and/or levels may be displayed via a display of the user interface 28. For example, the respective altitude estimates for the initial floor and/or level and/or one or more subsequent floors and/or levels may be stored (e.g., in memory 24) to a database and/or data file for future use. For example, the respective altitude estimates for the initial floor and/or level and/or one or more subsequent floors and/or levels may be provided as input to a positioning algorithm (e.g., a hybrid positioning algorithm that uses a combination of motion data captured by one or more sensors 30 and position fixes to determine a position estimate). For example, mobile apparatus 20 may provide (e.g., transmit) the respective altitude estimates for the initial floor and/or level and/or one or more subsequent floors and/or levels such that the network apparatus 10 receives the respective altitude estimates for the initial floor and/or level and/or one or more subsequent floors and/or levels.

In various embodiments, the one or more altitude estimates are provided in association with meta data that identifies the building and/or venue, a location of the building and/or venue (e.g., latitude and longitude, a street address, a point of interest (POI) identifier corresponding to the building and/or venue, and/or the like), respective floor names and/or indices associated with respective ones of the one or more altitude estimates, and/or the like. In an example embodiment, providing the respective altitude estimates for the initial floor and/or level and/or one or more subsequent floors and/or levels comprises providing one or more instances of radio observation data and respective associated three-dimensional position estimates that include respective altitude estimates. For example, the mobile apparatus 20 may provide (e.g., transmit) one or more instances of radio observation data and respective associated three-dimensional position estimates that include respective altitude estimates such that the network apparatus 10 receives the one or more instances of radio observation data and the respective associated three-dimensional position estimates.

In various embodiments, the network apparatus 10 receives the one or more respective altitude estimates for the initial floor and/or level and/or one or more subsequent floors and/or levels (and the associated metadata) and/or receives the one or more instances of radio observation data and respective associated three-dimensional position estimates. The network apparatus 10 then processes and/or analyzes the one or more respective altitude estimates for the initial floor and/or level and/or one or more subsequent floors and/or levels (and the associated metadata) and/or the one or more instances of radio observation data and respective associated three-dimensional position estimates. The network apparatus 10 uses a result of the processing and/or analyzing of the one or more respective altitude estimates for the initial floor and/or level and/or one or more subsequent floors and/or levels (and the associated metadata) and/or the one or more instances of radio observation data and respective associated three-dimensional position estimates to generate, update, and/or maintain a digital map such as a three-dimensional digital map, radio map, and/or positioning map that corresponds to a geographical area that comprises at least a portion of the building and/or venue. The network apparatus 10 may then provide at least a portion of the digital map.

For example, the network apparatus 10 comprise means, such as processor 12, memory 14, communications interface 16, and/or the like, for receiving the one or more respective altitude estimates for the initial floor and/or level and/or one or more subsequent floors and/or levels (and the associated metadata) and/or the one or more instances of radio observation data and respective associated three-dimensional position estimates; analyzing and/or processing the one or more altitudes estimates (and the associated metadata) and/or the one or more instances of radio observation data and the respective associated position estimates; generating, updating, and/or maintaining a digital map based on the results of analyzing and/or processing the one or more altitudes estimates (and the associated metadata) and/or the one or more instances of radio observation data and the respective associated position estimates; and providing (e.g., transmitting, storing, and/or the like) at least a portion of the digital map. For example, the mobile apparatus 20 or another computing entity may receive the at least a portion of the digital map. The mobile apparatus 20, other computing entity, and/or the network apparatus 10 may use the at least a portion of the digital map to perform one or more positioning and/or navigation-related functions. In various embodiments, the one or more positioning and/or navigation-related functions comprise one or more of positioning, position display (e.g., as an overlay and/or layer of a displayed portion of a digital map), route determination, route display, route guidance, radio environment learning (e.g., radio map updating), and/or the like.

In an example embodiment, at block 312, the mobile apparatus 20 processes and/or analyzes the one or more respective altitude estimates for the initial floor and/or level and/or one or more subsequent floors and/or levels (and the associated metadata) and/or the one or more instances of radio observation data and respective associated three-dimensional position estimates and uses a result of the processing and/or analyzing to generate, update, and/or maintain a digital map such as a three-dimensional digital map, radio map, and/or positioning map that corresponds to a geographical area that comprises at least a portion of the building and/or venue. For example, the mobile apparatus 20 comprise means, such as processor 22, memory 24, and/or the like, for analyzing and/or processing the one or more altitudes estimates (and the associated metadata) and/or the one or more instances of radio observation data and the respective associated position estimates; and generating, updating, and/or maintaining a digital map based on the results of analyzing and/or processing the one or more altitudes estimates (and the associated metadata) and/or the one or more instances of radio observation data and the respective associated position estimate.

In an example embodiment, the mobile apparatus 20 provides at least a portion of the digital map. For example, the mobile apparatus 20 comprises means, such as processor 22, memory 24, communications interface 26, and/or the like, for providing (e.g., transmitting, storing, and/or the like) at least a portion of the digital map. For example, another computing entity and/or the network apparatus 10 may receive the at least a portion of the digital map. The mobile apparatus 20, other computing entity, and/or the network apparatus 10 may use the at least a portion of the digital map to perform one or more positioning and/or navigation-related functions. In various embodiments, the one or more positioning and/or navigation-related functions comprise one or more of positioning, position display (e.g., as an overlay and/or layer of a displayed portion of a digital map), route determination, route display, route guidance, radio environment learning (e.g., radio map updating), and/or the like.

In various embodiments, other sensor data may be captured (e.g., by one or more sensors 30) while the mobile apparatus 20 is operating in the initial floor learning mode, secondary floor learning mode, and/or subsequent floor learning mode in order to identify various features that may be used to generate, update, and/or maintain a feature and/or positioning layer of a digital map. For example, in an example embodiment, digital images are captured by an imaging sensor 30 and analyzed to identify static features therein that may be used to generate, update, and/or maintain a layer of a positioning map that includes information and/or locations of static visible features that may be used for localization, and/or the like.

Example Operation of a Mobile Apparatus in an Initial Floor Learning Mode

FIG. 4 provides a flowchart illustrating various processes, procedures, operations, and/or the like for operating in an initial floor learning mode, according to an example embodiment. For example, the processes, procedures, operations, and/or the like shown in FIG. 4 are performed as part of block 304, in various embodiments. During operation of the mobile apparatus 20 in the initial floor learning mode, the mobile apparatus 20 is configured to learn, determine, and/or generate an altitude estimate for the initial floor and/or level of the building and/or venue. In various embodiments, the only floor and/or level for which an altitude estimate is determined during operation of the mobile apparatus 20 in the initial floor learning mode is the initial floor and/or level.

In various embodiments, the mobile apparatus 20 stores initial floor learning mode computer program code and/or executable instructions in memory 24. Execution of the initial floor learning mode computer program code and/or executable instructions by the processor 22 causes the mobile apparatus 20 to operate in the initial floor learning mode. In an example embodiment, the mobile apparatus 20 is a client device and/or operates at least in part in accordance with a distributed application/computing architecture and at least a portion of the initial floor learning mode program code and/or executable instructions are stored in memory 14 and/or executed by processor 12 of the network apparatus 10. In such an embodiment, at least some of the functions described herein as being performed by the mobile apparatus 20 are performed by the network apparatus 10.

Starting at block 402, the mobile apparatus 20 provides an indication and/or user instruction for the performance of an outdoor-indoor cycle via user interface 28. For example the mobile apparatus comprises means, such as processor 22, memory 24, user interface 28, and/or the like, for providing an indication and/or user instruction for the performance of an outdoor-indoor cycle. For example, the user interface 28 may display and/or audibly provide the instruction "Go outside" or "It's time to capture an outdoor position estimate" and/or other indication and/or user instruction that indicates that the user should move and/or carry the mobile apparatus 20 outdoors for a short time and then return to the initial floor and/or level within the building and/or venue. In various embodiments, the mobile apparatus 20 provides the indication and/or user instructions for performance of an outdoor-indoor cycle at least once every fifteen minutes during operation of the mobile apparatus 20 in the initial floor learning mode.

At block 404, the mobile apparatus 20 determines that it is located outdoors. For example, the mobile apparatus 20 comprises means, such as processor 22, memory 24, communications interface 26, user interface 28, sensors 30, and/or the like, for determining that the mobile apparatus 20 is outdoors (e.g., outside of the building and/or venue). For example, the user may interact with the user interface 28 to provide user input indicating that the mobile apparatus 20 is located outdoors. In an example embodiment, the communications interface 26 and/or radio sensors 30 may determine that the signal strength of radio nodes 40 associated with the building and/or venue have (collectively) decreased at least a threshold amount and based on this determination, determine that the mobile apparatus 20 is located outdoors. In an example embodiment, one or more sensors 30 may provide an indication of a change in the environment about the mobile apparatus 20 (e.g., a sudden change in ambient light, barometric pressure, humidity, temperature, and/or the like) and based on such indications, the mobile apparatus 20 may determine it is located outdoors. In an example embodiment, the GNSS sensor 30 may determine that a measure of precision (e.g., one or more dilution of precision measurements) and/or signal strength of a GNSS signal has increased at least a threshold amount and, based on this determination, the mobile apparatus 20 may determine it is located outdoors. In an example embodiment, an imaging sensor 30 (e.g., digital camera, LiDAR, and/or the like) may capture an image of the surroundings of the mobile apparatus 20 and analyze the image (e.g., using a machine-learning trained classifier and/or the like) to determine that the mobile apparatus 20 is located outdoors. In an example embodiment, the mobile apparatus 20 determines that particular amount of time has passed since the indication and/or user instruction to go outside was provided and, based thereon, determine that the mobile apparatus 20 is located outdoors. In various embodiments, various combinations of these techniques and/or other techniques may be used to determine that the mobile apparatus 20 is located outdoors.

At block 406, the mobile apparatus 20 captures an outdoor position estimate. For example, the mobile apparatus 20 comprises means, such as processor 22, memory 24, sensors 30, and/or the like, for capturing and outdoor position estimate. In various embodiments, the outdoor position estimate is a GNSS-based position estimate. In various embodiments, the outdoor position estimate comprises an outdoor elevation estimate that indicates and/or approximates the altitude of the mobile apparatus 20 when it is located outdoors and/or when the outdoor position estimate was captured. In an example embodiment, once the outdoor position estimate is captured, the user interface 28 may provide (e.g., display and/or audibly provide) an indication and/or user instruction that the outdoor position estimate capture is complete and/or for the user to move and/or carry the mobile apparatus 20 to the initial floor and/or level of the building.

At block 408, the mobile apparatus 20 determines that the mobile apparatus 20 is located indoors (e.g., inside the building and/or venue) and on the initial floor and/or level of the building and/or venue. For example, the mobile apparatus 20 comprises means, such as processor 22, memory 24, communications interface 26, user interface 28, sensors 30, and/or the like, for determining that the mobile apparatus 20 is indoors (e.g., inside of the building and/or venue) and on the initial floor and/or level. For example, the user may interact with the user interface 28 to provide user input indicating that the mobile apparatus 20 is located indoors and/or on the initial floor and/or level. In an example embodiment, the communications interface 26 and/or radio sensors 30 may determine that the signal strength of radio nodes 40 associated with the building and/or venue and/or the initial floor and/or level have (collectively) increased at least a threshold amount and based on this determination, determine that the mobile apparatus 20 is located indoors and on the initial floor and/or level. In an example embodiment, one or more sensors 30 may provide an indication of a change in the environment about the mobile apparatus (e.g., a sudden change in ambient light, barometric pressure, humidity, temperature, and/or the like) and based on such indications, the mobile apparatus 20 may determine it is located indoors and/or on the initial floor. In an example embodiment, the GNSS sensor 30 may determine that a measure of precision (e.g., one or more dilution of precision measurements) and/or signal strength of a GNSS signal has decreased at least a threshold amount and, based on this determination, the mobile apparatus 20 may determine it is located indoors and/or on the initial floor and/or level. In an example embodiment, an imaging sensor 30 (e.g., digital camera, LiDAR, and/or the like) may capture an image of the surroundings of the mobile apparatus 20 and analyze the image (e.g., using a machine-learning trained classifier and/or the like) to determine that the mobile apparatus 20 is located indoors and/or on the initial floor and/or level. In an example embodiment, the mobile apparatus 20 determines that particular amount of time has passed since the indication and/or user instruction to return to the initial floor and/or level was provided and, based thereon, determine that the mobile apparatus 20 is located indoors and on the initial floor and/or level. In various embodiments, various combinations of these techniques and/or other techniques may be used to determine that the mobile apparatus 20 is located indoors and on the initial floor and/or level.

At block 410, the mobile apparatus determines a change in altitude between the time the outdoor position estimate was captured and when the mobile apparatus 20 determined it was located indoors on the initial floor and/or level. For example, the mobile apparatus comprises means, such as processor 22, memory 24, sensors 30, and/or the like, for determining a change in altitude between the time the outdoor position estimate was captured and when the mobile apparatus 20 determined it was located indoors on the initial floor and/or level. For example, acceleration data captured by one or more acceleration sensors 30, barometric pressure data captured by one or more barometers and/or other pressure sensors 30, magnetic data captured by one or more magnetometers and/or magnetic sensors 30, and/or the like may be used to determine the altitude change experienced by the mobile apparatus 20 between the moment when the outdoor position estimate was captured and when the mobile apparatus 20 was determined to be located on the initial floor and/or level. In an example embodiment, change in altitude is determined at least in part based on user input received via the user interface 28 providing information regarding the path the mobile apparatus 20 traveled between the moment when outdoor position estimate was captured and when it was determined that the mobile apparatus 20 is located on the initial floor. For example, the user input may indicate a number of stairs, number of flights of steps, number of escalators, number of elevator stops (and/or floors and/or levels passed on the elevator), the presence of any ramps, and/or the like along the path traveled from where the outdoor position estimate was captured and the initial floor.

At block 412, the mobile apparatus 20 determines and/or generates an instant altitude estimate for the initial floor and/or level. For example, the instant altitude estimate for the initial floor and/or level is determined based on the altitude estimate of the outdoor position estimate and the determined change in altitude between the time the outdoor position estimate was captured and when the mobile apparatus 20 determined it was located on the initial floor and/or level, in an example embodiment. In an example embodiment, the instant altitude estimate is taken as the altitude estimate for the initial floor and/or level. In various embodiments, a plurality of outdoor-indoor cycles are performed such that a plurality of instant altitude estimates are determined and aggregated to generate and/or determine the altitude estimate for the initial floor and/or level. For example, the instant altitude estimate for the initial floor and/or level may be aggregated with any previous instant altitude estimates and/or a previously generated and/or determined aggregated altitude estimate to determine an altitude estimate for the initial floor and/or level. For example, a plurality of instant altitude estimates may be averaged together to determine the altitude estimate for the initial floor and/or level. In an example embodiment, the instant altitude estimate may be aggregated with a previously generated and/or determined aggregated altitude estimate and/or one or more other instant altitude estimates using a weighted average. In an example embodiment, the weights used for performing the weighted average are determined based at least in part on a confidence level and/or certainty associated with each instant altitude estimate. In an example embodiment, a statistical distribution of the instant altitude estimates is used to determine an altitude estimate for the initial floor and/or level.

In various embodiments, the mobile apparatus 20 determines a certainty and/or confidence level for the instant altitude estimate and/or for the (aggregated) altitude estimate for the initial floor and/or level. For example, the certainty and/or confidence level for an instant altitude estimate is determined based on a certainty and/or confidence level of the outdoor altitude estimate of the outdoor position estimate and/or a certainty and/or confidence level of the determined altitude change, in an example embodiment. For example, the certainty and/or confidence level for the (aggregated) altitude estimate for the initial floor and/or level is determined based on the certainty and/or confidence level of the instant altitude estimates that were aggregated to generate and/or determine the (aggregated) altitude estimate for the initial floor and/or level.

At block 414, the mobile apparatus 20 determines whether the certainty and/or confidence level for the altitude estimate for the initial floor and/or level satisfies one or more first threshold certainty and/or confidence level criteria. For example, the mobile apparatus 20 comprises means, such as processor 22, memory 24, and/or the like, for determining whether the certainty and/or confidence level for the altitude estimate for the initial floor and/or level satisfies one or more first threshold certainty and/or confidence level criteria. For example, when the certainty and/or confidence level of the altitude estimate for the initial floor and/or level meets and/or exceeds a threshold certainty and/or confidence level, then the mobile apparatus 20 determines that the altitude estimate for the initial floor and/or level satisfies one or more first threshold certainty and/or confidence level criteria, in an example embodiment. When the certainty and/or confidence level of the altitude estimate for the initial floor and/or level is less than the threshold certainty and/or confidence level, then the mobile apparatus 20 determine that the altitude estimate of the initial floor and/or level does not satisfy the first threshold certainty and/or confidence level criteria, in an example embodiment. For example, the first threshold certainty and/or confidence level criteria corresponds to the altitude estimate of the initial floor and/or level being confidently known and/or known within a certainty range of five meters or less, in an example embodiment. In various embodiments, the first threshold certainty and/or confidence level criteria corresponds to the altitude estimate of the initial floor and/or level being confidently known and/or known within a certainty range of two meters or less, one meter or less, half a meter or less, and/or the like.

When it is determined, at block 414, that the altitude estimate for the initial floor and/or level does not satisfy the one or more first threshold certainty criteria, the process returns to block 402 and another outdoor-indoor cycle is performed. When it is determined, at block 414, that the altitude estimate for the initial floor and/or level does satisfy the one or more first threshold certainty criteria, the process returns the altitude estimate for the initial floor and/or level and proceeds to block 306, in various embodiments.

Example Determination of a Building Floor Height

FIG. 5 provides a flowchart illustrating various processes, procedures, operations, and/or the like for determining a building floor height, according to an example embodiment. For example, the processes, procedures, operations, and/or the like shown in FIG. 5 are performed as part of block 306, in various embodiments.

At block 502, in an example embodiment, the mobile apparatus 20 determines floor height information for the building and/or venue based on a priori information for the building and/or venue. In an example embodiment, the mobile apparatus accesses and/or obtains (e.g., from the network apparatus 10 via network 50) a building floor height for the building and/or venue based on a priori information for the building and/or venue. For example, accessible information for the building and/or venue (e.g., available as part of public records, a digital map, and/or another data source accessible to the network apparatus 10 and/or mobile apparatus 20) may be accessed (e.g., requested and/or received via an appropriate application program interface (API) and/or the like) to determine and/or obtain a building floor height for the building and/or venue. For example, the mobile apparatus 20 comprises means, such as processor 22, memory 24, communications interface 26, user interface 28, and/or the like, for accessing and/or obtaining a priori information for the building and/or venue and determining a building floor height based at least in part on the accessed and/or obtained a priori information.

At block 504, in an example embodiment, the mobile apparatus 20 operates in a secondary floor learning mode to learn, determine, and/or generate an altitude estimate for a secondary floor and/or level and determine a building floor height based on the altitude estimate for the initial floor and/or level and the altitude estimate for the secondary floor and/or level. For example, the mobile apparatus 20 comprises means, such as processor 22, memory 24, communications interface 26, user interface 28, sensors 30, and/or the like for operating in a secondary floor learning mode. In an example embodiment, operating in the secondary floor learning mode comprises performing one or more outdoor-indoor cycles where the mobile apparatus 20 is moved and/or carried between the outdoors and the secondary floor and/or level. In an example embodiment, operating in the secondary floor learning mode comprises moving the mobile apparatus 20 between the initial floor and/or level and the secondary floor and/or level multiple times such that sensor data may be used to determine an altitude change between the initial floor and/or level and the secondary floor and/or level. In an example embodiment, operating in the secondary floor learning mode comprises one or more outdoor-indoor cycles where the mobile apparatus 20 is moved and/or carried between the outdoors and the secondary floor and/or level and the mobile apparatus 20 being moved and/or carried between the initial floor and/or level and the secondary floor and/or level multiple times.

In various embodiments, the result of operating in the secondary floor learning mode is an altitude estimate for the secondary floor and/or level (which is one of the subsequent floors and/or levels of the building) and/or an altitude difference between the initial floor and/or level and the secondary floor and/or level. Based on a result of operating in the secondary floor learning mode, a floor height for the building is determined and can be used for determining altitude estimates for other subsequent floors and/or levels during operation of the mobile apparatus in the subsequent floor learning mode.

At block 506, the mobile apparatus 20 determines the building floor height while operating in the subsequent floor learning mode by determining one or more altitude changes based on sensor data captured by one or more sensors of the mobile apparatus 20 as the mobile apparatus 20 moves between different floors and/or levels of the building and/or venue. For example, the mobile apparatus 20 comprises means, such as processor 22, memory 24, sensors 30, and/or the like, for determining a building floor height based on determined altitude change(s) determined based on sensor data. For example, during operation of the mobile apparatus 20 in the subsequent floor learning mode, the mobile apparatus 20 may be moved and/or carried between various floors and/or levels of the building and/or venue (e.g., the initial floor and/or level and one or more subsequent floors and/or levels). When the mobile apparatus 20 enters a floor and/or level and/or while the apparatus is located on a floor and/or level, the mobile apparatus 20 may receive user input (e.g., via user interface 28) indicating on which floor and/or level the mobile apparatus 20 is located. Based on sensor data (e.g., acceleration data captured by one or more acceleration sensors 30, barometric pressure data captured by one or more barometers and/or other pressure sensors 30, magnetic data captured by one or more magnetometers and/or magnetic sensors 30, and/or the like) captured by one or more sensors 30 as the mobile apparatus 20 moves between floors and/or levels within the building and/or venue, the mobile apparatus 20 may determine respective altitude changes between particular pairs of floors and/or levels (e.g., between the initial floor and/or level and a particular subsequent floor and/or level, between two particular subsequent floors and/or levels, and/or the like). Based on these determined altitude changes, the mobile apparatus 20 may determine a building floor height for the building and/or venue and/or may determine altitude estimates for respective subsequent floors.

Example Operation of a Mobile Apparatus in Secondary Floor Learning Mode

In various embodiments, the respective altitude estimates determined for one or more subsequent floors and/or levels of the building and/or venue are determined based at least in part on a determined floor height for the building and/or venue. In various embodiments, the determined floor height for the building and/or venue is determined while the mobile apparatus 20 operates in a secondary floor learning mode. For example, the mobile apparatus 20 may be moved and/or carried between a reference location and/or altitude (e.g., an outdoor location where an outdoor position estimate including an outdoor altitude estimate can be captured or the initial floor and/or level) and a secondary floor and/or level. For example, the secondary floor is a selected subsequent floor and/or level, in various embodiments. Based on the sensor data captured by the sensors 30 while the mobile apparatus 20 is moved and/or carried between the reference location and/or altitude and the secondary floor and/or level, an altitude estimate for the secondary floor and/or level and/or a change in altitude between the initial floor and/or level and the secondary floor and/or level is determined. In various embodiments, the mobile apparatus 20 is moved and/or carried between the reference location and/or altitude and the secondary floor and/or level multiple times such that the altitude estimate for the secondary floor and/or level and/or the change in altitude between the initial floor and/or level and the secondary floor and/or level is determined iteratively. In various embodiments, the only floor and/or level for which an altitude estimate is determined during operation of the mobile apparatus 20 in the secondary floor learning mode is the secondary floor and/or level.

In various embodiments, the mobile apparatus 20 stores secondary floor learning mode computer program code and/or executable instructions in memory 24. Execution of the secondary floor learning mode computer program code and/or executable instructions by the processor 22 causes the mobile apparatus 20 to operate in the secondary floor learning mode. In an example embodiment, the mobile apparatus 20 is a client device and/or operates at least in part in accordance with a distributed application/computing architecture and at least a portion of the secondary floor learning mode program code executable instructions are stored in memory 14 and/or executed by processor 12 of the network apparatus 10. In such an embodiment, at least some of the functions described herein as being performed by the mobile apparatus 20 are performed by the network apparatus 10.

FIG. 6 provides a flowchart illustrating various processes, procedures, operations, and/or the like that may be performed while the mobile apparatus 20 is operating in the secondary floor learning mode. For example, the processes, procedures, operations, and/or the like shown in FIG. 6 are performed as at least part of block 306, in an example embodiment.

Starting at block 602, the mobile apparatus 20 provides an indication and/or user instruction (e.g., via user interface 28) that a secondary floor cycle is to be performed. For example, the mobile apparatus 20 comprises means, such as processor 22, memory 24, user interface 28, and/or the like, for providing an indication and/or user instruction that a secondary floor cycle is to be performed. For example, the indication and/or user instruction may indicate that the mobile apparatus 20 should be moved and/or carried to a reference location and/or altitude. In various embodiments, the reference location and/or altitude is outdoors (e.g., outside of the building and/or venue) or on the initial floor and/or level of the building and/or venue.

At block 604, the mobile apparatus 20 determines that the mobile apparatus 20 is located at the reference location and/or altitude. For example, the mobile apparatus 20 comprises means, such as processor 22, memory 24, user interface 28, sensors 30, and/or the like, for determining when the mobile apparatus 20 is located at the reference location and/or altitude. For example, the mobile apparatus 20 may receive user input (e.g., via user interface 28) indicating that the mobile apparatus 20 is located at the reference location and/or altitude and/or determine based on sensor data captured by one or more sensors 30 that the mobile apparatus 20 is located at the reference location and/or altitude (e.g., similar to as described above with respect to block 404). When the mobile apparatus 20 determines that the mobile apparatus is located at the reference location and/or altitude, the mobile apparatus 20 determines a reference altitude for the reference location and/or altitude. For example, when the reference location and/or altitude is outdoors, the reference altitude may be determined by capturing a GNSS-based position estimate that includes an outdoor altitude estimate. For example, the outdoor altitude estimate is used as the reference altitude, in an example embodiment. For example, when the reference location and/or altitude is the initial floor and/or level, the altitude estimate for the initial floor and/or level is used as the reference altitude.

At block 606, as the mobile apparatus 20 is moved and/or carried between the reference location and/or altitude and the secondary floor and/or level, the mobile apparatus 20 captures sensor data (e.g., via one or more sensors). For example, the mobile apparatus 20 comprises means, such as processor 22, memory 24, sensors 30, and/or the like, for capturing sensor data as the mobile apparatus 20 is moved and/or carried between the reference location and/or altitude and the secondary floor and/or level. For example, the captured sensor data may include acceleration data captured by one or more acceleration sensors 30, barometric pressure data captured by one or more barometers and/or other pressure sensors 30, magnetic data captured by one or more magnetometers and/or magnetic sensors 30, and/or the like. In particular, the captured sensor data enables the mobile apparatus 20 to determine, estimate, and/or approximate an altitude change between the reference location and the secondary floor and/or level.

At block 608, the mobile apparatus 20 determines that the mobile apparatus 20 is located on the secondary floor and/or level. For example, the mobile apparatus 20 comprises means, such as processor 22, memory 24, user interface 28, sensors 30, and/or the like, for determining when the mobile apparatus 20 is located on the secondary floor and/or level. For example, the mobile apparatus 20 may receive user input (e.g., via user interface 28) indicating that the mobile apparatus 20 is located on the secondary floor and/or level and/or determine based on sensor data captured by one or more sensors 30 that the mobile apparatus 20 is located on the secondary floor and/or level (e.g., similar to as described above with respect to block 408).

At block 610, the mobile apparatus 20 determines an altitude estimate for the secondary floor and/or level and/or determines a change in altitude between the reference altitude and the secondary floor and/or level based at least in part on the sensor data captured at block 606. For example, the mobile apparatus 20 comprises means, such as processor 22, memory 24, and/or the like, for determining an altitude estimate for the secondary floor and/or level and/or determining a change in altitude between the reference location and/or altitude and the secondary floor and/or level based at least in part on sensor data. For example, The sensor data (e.g., acceleration data, barometric pressure data, magnetic data, and/or the like) captured at block 606 is processed and/or analyzed to determine a change in altitude between the reference location and/or altitude and the secondary floor and/or level. An altitude estimate for the secondary floor and/or level is determined based on the reference altitude and the determined change in altitude between the reference location and/or altitude and the secondary floor and/or level, in an example embodiment.

In various embodiments, multiple secondary floor cycles are performed such that an aggregated altitude estimate for the secondary floor and/or level and/or aggregated change in altitude between the reference altitude and the secondary floor and/or level is determined. For example, an average, weighted average, and/or analysis of a statistical distribution of a plurality of instant altitude estimates for the secondary floor and/or level and/or instant changes in altitude between the reference altitude and the secondary floor and/or level are determined to generate the aggregated altitude estimate for the secondary floor and/or level and/or aggregated change in altitude between the reference altitude and the secondary floor and/or level.

In various embodiments, the mobile apparatus 20 determines a certainty and/or confidence level for the instant altitude estimate and/or for the (aggregated) altitude estimate for the secondary floor and/or level and/or for the instant and/or aggregated change in altitude between the reference altitude and the secondary floor and/or level. For example, the certainty and/or confidence level for an instant altitude estimate is determined based on a certainty and/or confidence level of the outdoor altitude estimate of the outdoor position estimate and/or a certainty and/or confidence level of the determined altitude change, in an example embodiment. For example, the certainty and/or confidence level for the (aggregated) altitude estimate for the secondary floor and/or level is determined based on the certainty and/or confidence level of the instant altitude estimates that were aggregated to generate and/or determine the (aggregated) altitude estimate for the secondary floor and/or level.

At block 612, the mobile apparatus 20 determines whether the certainty and/or confidence level for the altitude estimate for the secondary floor and/or level and/or for the change in altitude between the reference altitude and the secondary floor and/or level satisfies one or more second threshold certainty and/or confidence level criteria. For example, the mobile apparatus 20 comprises means, such as processor 22, memory 24, and/or the like, for determining whether the certainty and/or confidence level for the altitude estimate for the secondary floor and/or level satisfies one or more second threshold certainty and/or confidence level criteria and/or for the change in altitude between the reference altitude and the secondary floor and/or level. For example, when the certainty and/or confidence level of the altitude estimate for the secondary floor and/or level and/or for the change in altitude between the reference altitude and the secondary floor and/or level meets and/or exceeds a second threshold certainty and/or confidence level, then the mobile apparatus 20 determines that the altitude estimate for the secondary floor and/or level and/or the change in altitude between the reference altitude and the secondary floor and/or level satisfies one or more second threshold certainty and/or confidence level criteria, in an example embodiment. When the certainty and/or confidence level of the altitude estimate for the secondary floor and/or level and/or for the change in altitude between the reference altitude and the secondary floor and/or level is less than the threshold certainty and/or confidence level, then the mobile apparatus 20 determines that the altitude estimate for the initial floor and/or level does not satisfy the second threshold certainty and/or confidence level criteria, in an example embodiment. For example, the second threshold certainty and/or confidence level criteria corresponds to the altitude estimate of the secondary floor and/or level and/or the change in altitude between the reference altitude and the secondary floor and/or level being confidently known and/or known within a certainty range of five meters or less, in an example embodiment. In various embodiments, the second threshold certainty and/or confidence level criteria corresponds to the altitude estimate of the secondary floor and/or level and/or the change in altitude between the reference altitude and the secondary floor and/or level being confidently known and/or known within a certainty range of two meters or less, one meter or less, half a meter or less, and/or the like.

When it is determined, at block 612, that the altitude estimate for the secondary floor and/or level and/or the change in altitude between the reference altitude and the secondary floor and/or level does not satisfy the one or more second threshold certainty criteria, the process returns to block 602 and another secondary floor cycle is performed. When it is determined, at block 612, that the altitude estimate for the secondary floor and/or level and/or the change in altitude between the reference altitude and the secondary floor and/or level does satisfy the one or more second threshold certainty criteria, the process continues to block 614.

At block 614, the mobile apparatus 20 determines a building floor height for the building and/or venue based at least in part on the change in altitude between the reference altitude and the secondary floor and/or level, the altitude estimate for the secondary floor and/or level, the altitude estimate for the initial floor and/or level, a number of floors and/or levels located between the initial floor and/or level and the secondary floor and/or level, and/or the like. For example, the altitude difference between the initial floor and/or level and the secondary floor and/or level is determined. The altitude difference between the initial floor and/or level and the secondary floor and/or level is then divided between and/or allocated (evenly or in a weighted manner) to any floors and/or levels located between the initial floor and/or level and the secondary floor and/or level such that the building floor height for the building and/or venue is determined. For example, the mobile apparatus 20 comprises means, such as processor 22, memory 24, and/or the like, for determining the building floor height for the building and/or venue based on the change in altitude between the reference altitude and the secondary floor and/or level, the altitude estimate for the secondary floor and/or level, the altitude estimate for the initial floor and/or level, and/or a number of floors and/or levels located between the initial floor and/or level and the secondary floor and/or level. The mobile apparatus 20 returns the building floor height for the building and/or venue (and possibly the altitude estimate for the secondary floor and/or level) and proceeds to block 308, in various embodiments.

Example Operation of a Mobile apparatus in a Subsequent Floor Learning Mode

FIG. 7 provides a flowchart illustrating various processes, procedures, operations, and/or the like for operating in a subsequent floor learning mode, according to an example embodiment. For example, the processes, procedures, operations, and/or the like shown in FIG. 7 are performed as part of block 308, in various embodiments. During operation of the mobile apparatus 20 in the initial floor learning mode, the mobile apparatus 20 is configured to learn, determine, and/or generate an altitude estimate for one or more subsequent floors and/or levels of the building and/or venue.

In various embodiments, the mobile apparatus 20 stores subsequent floor learning mode computer program code and/or executable instructions in memory 24. Execution of the subsequent floor learning mode computer program code and/or executable instructions by the processor 22 causes the mobile apparatus 20 to operate in the subsequent floor learning mode. In an example embodiment, the mobile apparatus 20 is a client device and/or operates at least in part in accordance with a distributed application/computing architecture and at least a portion of the subsequent floor learning mode program code and/or executable instructions are stored in memory 14 and/or executed by processor 12 of the network apparatus 10. In such an embodiment, at least some of the functions described herein as being performed by the mobile apparatus 20 are performed by the network apparatus 10.

In various embodiments, the mobile apparatus 20 is configured to determine and/or generate altitude estimates for one or more subsequent floors and/or levels in parallel and/or serially during operation in the subsequent floor learning mode. For example, in an example embodiment, the mobile apparatus 20 is moved between the initial floor and/or level (and/or the secondary floor and/or level is one was selected and an altitude estimate determined therefor) and a respective subsequent floor and/or level until the altitude estimate for the respective subsequent floor and/or level satisfies a third threshold certainty, in an example embodiment where the subsequent floor(s) and/or level(s) are learned serially. In another example, in an example embodiment, the mobile apparatus 20 is moved between various floors and/or levels (e.g., the initial floor and/or level (and/or the secondary floor and/or level is one was selected and an altitude estimate determined therefor) and one or more respective subsequent floors and/or levels) while the altitude estimates for the one or more respective subsequent floors and/or levels are determined in parallel. FIG. 7 shows the learning, determining, and/or generating of an altitude estimate for a respective floor and/or level. The processes, procedures, operations, and/or the like shown in FIG. 7 may be performed in parallel for multiple respective subsequent floors and/or levels and/or performed serially for multiple respective subsequent floors and/or levels, in various embodiments.

Starting at block 702, the mobile apparatus 20 provides an indication and/or user instruction (e.g., via user interface 28) to capture data corresponding to a respective subsequent floor and/or level. For example, the mobile apparatus 20 comprises means, such as processor 22, memory 24, user interface 28, and/or the like, for providing an indication and/or user instruction to capture data corresponding to a respective subsequent floor and/or level. For example, the indication and/or user instruction may indicate that the mobile apparatus 20 should be moved and/or carried to the respective subsequent floor and/or level.

At block 704, the mobile apparatus 20 determines that the mobile apparatus 20 is located on the respective subsequent floor. For example, the mobile apparatus 20 comprises means, such as processor 22, memory 24, communications interface 26, user interface 28, sensors 30, and/or the like, for determining that the mobile apparatus 20 is located on the respective subsequent floor. For example, the mobile apparatus 20 may receive user input (e.g., via user interface 28) indicating that the mobile apparatus 20 is located on the respective subsequent floor and/or level. For example, an imaging sensor (e.g., camera, LiDAR, radar, and/or the like) may capture image data that, when analyzed by an image processing application and/or machine-learning trained model operating on the mobile apparatus 20 (and/or network apparatus 20) provides an indication that the mobile apparatus 20 is located on the respective subsequent floor and/or level. In another example, a radio node 40 located on the respective subsequent floor may be configured to broadcast a signal that, when received and/or observed by the mobile apparatus 20, indicates to the mobile apparatus 20 that the mobile apparatus 20 is located on the respective subsequent floor. For example, based on sensor data and/or user input, a floor name, floor index, and/or relationship between the floor upon which the mobile apparatus 20 is located and the initial floor and/or level, for example, is determined.

In various embodiments, possibly responsive to determining that the mobile apparatus 20 is located on the respective subsequent floor and/or level, the mobile apparatus 20 determines an altitude change since the mobile apparatus was last located on a floor and/or level for which the mobile apparatus 20 had access to the corresponding floor name and/or index and/or for which an altitude estimate has already been determined (e.g., the initial floor and/or level, secondary floor and/or level, a subsequent floor and/or level for which the altitude estimate has already been determined, and/or the like). For example, prior to the mobile apparatus 20 being located on the respective subsequent floor, the mobile apparatus 20 was located on the initial floor and/or level and an altitude change between the initial floor and/or level and the respective subsequent floor and/or level may be determined.

At block 706, the mobile apparatus 20 determines whether the floor name, floor index, and/or relationship between the floor upon which the mobile apparatus 20 is located and the initial floor and/or level, for example, is consistent with the determined altitude change. For example, if the altitude change indicates that the mobile apparatus 20 has not changed floors and/or levels and/or indicates that the mobile apparatus 20 has a lower altitude now than before when the respective subsequent floor is located above the initial floor and/or level (and/or previous floor and/or level) the mobile apparatus 20 determines that the floor name, floor index, and/or relationship between the floor upon which the mobile apparatus 20 is located and the initial floor and/or level, for example, is not consistent with the determined altitude change. In another example, if the altitude change indicates that the mobile apparatus 20 has a (reasonably) higher altitude now than before when the respective subsequent floor is located above the initial floor and/or level (and/or previous floor and/or level) the mobile apparatus 20 determines that the floor name, floor index, and/or relationship between the floor upon which the mobile apparatus 20 is located and the initial floor and/or level, for example, is consistent with the determined altitude change. For example, the mobile apparatus 20 comprises means, such as processor 22, memory 24, and/or the like, for determining whether the user input and/or sensor data determined floor name, floor index, and/or relationship between the floor upon which the mobile apparatus 20 is located and the initial floor and/or level, for example, is consistent with the determined altitude change.

When the user input and/or sensor data determined floor name, floor index, and/or relationship between the floor upon which the mobile apparatus 20 is located and the initial floor and/or level, for example, is determined to not be consistent with the determined altitude change, the process proceeds to block 708. At block 708, the mobile apparatus 20 may provide (e.g., via the user interface 28) a notification and/or indication of the inconsistency and/or discard and/or not use the data captured on that visit to the respective subsequent floor and/or level. For example, the mobile apparatus 20 comprises means, such as processor 22, memory 24, communications interface 26, user interface 28, and/or the like for providing a notification and/or indication of the inconsistency and/or discarding and/or not using the data captured on that visit to the respective subsequent floor and/or level. The process may then return to block 702 and/or block 704, in various embodiments.

When the user input and/or sensor data determined floor name, floor index, and/or relationship between the floor upon which the mobile apparatus 20 is located and the initial floor and/or level, for example, is determined to be consistent with the determined altitude change, the process proceeds to block 710.

At block 710, the mobile apparatus 20 determines and/or generates an instant altitude estimate for the respective subsequent floor and/or level. For example, the instant altitude estimate for the respective subsequent floor and/or level is determined based on the altitude estimate for the initial floor and/or level and/or another subsequent floor and/or level for which an altitude estimate has been determined and the sensor data-based determined altitude change between when the mobile apparatus 20 was located on the initial floor and/or level and/or the other subsequent floor and/or level with a determined altitude estimate and when the mobile apparatus 20 determined it was located on the respective subsequent floor and/or level, in an example embodiment. In an example embodiment, the instant altitude estimate is determined based on the altitude estimate for the initial floor and/or level, a building floor height for the building and/or venue, and a relationship between the initial floor and/or level and the respective subsequent floor and/or level. In various embodiments, the building floor height may be a determined building floor height (e.g., determined during operating in a secondary floor learning mode) or a building floor height determined based on a priori information.

In an example embodiment, the instant altitude estimate is taken as the altitude estimate for the respective subsequent floor and/or level. For example, when the altitude estimate is determined based on the altitude estimate for the initial floor and/or level, a building floor height for the building and/or venue, and a relationship between the initial floor and/or level and the respective subsequent floor and/or level, the instant altitude estimate is taken as the altitude estimate for the respective subsequent floor and/or level, in various embodiments. In such an embodiment, it may not be required to determine whether the altitude estimate for the respective subsequent floor satisfies a third certainty threshold criteria.

In various embodiments, a plurality of visits to the respective subsequent floor and/or level are performed such that a plurality of instant altitude estimates are determined and aggregated to generate and/or determine the altitude estimate for the respective subsequent floor and/or level. For example, when the instant altitude estimate is determined based on the altitude estimate for the initial floor and/or level and/or another subsequent floor and/or level for which an altitude estimate has been determined and the sensor data-based determined altitude change between when the mobile apparatus 20 was located on the initial floor and/or level and/or the other subsequent floor and/or level with a determined altitude estimate and when the mobile apparatus 20 determined it was located on the respective subsequent floor and/or level, a plurality of instant altitude estimates may be determined and used to determine and/or generate an aggregated altitude estimate. For example, the instant altitude estimate may be aggregated with any previous instant altitude estimates and/or a previously generated and/or determined aggregated altitude estimate for the respective subsequent floor and/or level to determine an altitude estimate for the respective subsequent floor and/or level. For example, a plurality of instant altitude estimates may be averaged together to determine the altitude estimate for the respective subsequent floor and/or level. In an example embodiment, the instant altitude estimate may be aggregated with a previously generated and/or determined aggregated altitude estimate and/or one or more other instant altitude estimates using a weighted average. In an example embodiment, the weights used for performing the weighted average are determined based at least in part on a confidence level and/or certainty associated with each instant altitude estimate. In an example embodiment, a statistical distribution of the instant altitude estimates for the respective subsequent floor and/or level is used to determine an altitude estimate for the respective subsequent floor and/or level.

In various embodiments, the mobile apparatus 20 determines a certainty and/or confidence level for the instant altitude estimate and/or for the (aggregated) altitude estimate for the respective subsequent floor and/or level. For example, the certainty and/or confidence level for the (aggregated) altitude estimate for the respective subsequent floor and/or level is determined based on the certainty and/or confidence level of the instant altitude estimates that were aggregated to generate and/or determine the (aggregated) altitude estimate for the respective subsequent floor and/or level.

At block 712, the mobile apparatus 20 determines whether the certainty and/or confidence level for the altitude estimate for the respective subsequent floor and/or level satisfies one or more third threshold certainty and/or confidence level criteria. For example, the mobile apparatus 20 comprises means, such as processor 22, memory 24, and/or the like, for determining whether the certainty and/or confidence level for the altitude estimate for the respective subsequent floor and/or level satisfies one or more third threshold certainty and/or confidence level criteria. For example, when the certainty and/or confidence level of the altitude estimate for the respective subsequent floor and/or level meets and/or exceeds a threshold certainty and/or confidence level, then the mobile apparatus 20 determines that the altitude estimate for the respective subsequent floor and/or level satisfies one or more third threshold certainty and/or confidence level criteria, in an example embodiment. When the certainty and/or confidence level of the altitude estimate for the respective subsequent floor and/or level is less than the threshold certainty and/or confidence level, then the mobile apparatus 20 determines that the altitude estimate for the respective subsequent floor and/or level does not satisfy the third threshold certainty and/or confidence level criteria, in an example embodiment. For example, the third threshold certainty and/or confidence level criteria corresponds to the altitude estimate of the respective subsequent floor and/or level being confidently known and/or known within a certainty range of five meters or less, in an example embodiment. In various embodiments, the third threshold certainty and/or confidence level criteria corresponds to the altitude estimate of the respective subsequent floor and/or level being confidently known and/or known within a certainty range of two meters or less, one meter or less, half a meter or less, and/or the like.

In various embodiments, the first threshold certainty criteria, second threshold certainty criteria, and/or third threshold certainty criteria are the same as one another (e.g., the same threshold certainty criteria are applied during the initial floor learning mode, secondary floor learning mode (if one is performed), and subsequent floor learning mode). In an example embodiment, the first threshold certainty criteria, second threshold certainty criteria, and/or third threshold certainty criteria are different from one another (e.g., the threshold certainty criteria applied during the initial floor learning mode are different from the threshold criteria applied during secondary floor learning mode and/or subsequent floor learning mode).

When it is determined, at block 712, that the altitude estimate for the respective subsequent floor and/or level does not satisfy the one or more third threshold certainty criteria, the process returns to block 702 and another visit to the respective subsequent floor and/or level is performed. When it is determined, at block 702, that the altitude estimate for the respective subsequent floor and/or level does satisfy the one or more third threshold certainty criteria, the process returns the altitude estimate for the respective subsequent floor and/or level, in various embodiments. In various embodiments, once an altitude estimate has been returned for each respective subsequent floor and/or level (and/or user input ending the building learning session is received), the process continues to block 310, in various embodiments.

IV. Technical Advantages

Conventionally, indoor positioning techniques do not allow for the determination of an altitude estimate for an indoor position unless altitude information for the building and/or venue in question is already provided by the employed positioning map. For example, as GNSS-based position estimates are not available and/or not reliable for indoor positioning, determining the absolute altitude of a floor and/or level of a building and/or venue and/or generating positioning maps that include absolute altitude information for floors and/or levels of buildings and/or venues are technical problems in the field of indoor positioning.

Currently, the absolute altitude for a floor of a building is estimated using a combination of GNSS-based position estimates and barometer data. This method requires that the user regularly (e.g., every ten to fifteen minutes) goes outdoors and that the user captures data for each area many times. This is because GNSS altitude estimates are not very precise, so a large number of GNSS altitude measurements are needed to determine reliable absolute altitude data for the barometer calibration. Additionally, errors in the GNSS altitude estimates of a single outdoor visit may be correlated because GNSS receivers often do positioning filtering internally. Moreover, the barometer must be re-calibrated frequently enough so that air pressure changes due to weather can be compensated and a large number of altitude change measurements are required so that random barometer measurement errors are canceled out. Furthermore, the outdoor visits must be made to a single-floor area so that the altitude map correction can be applied. Thus, even if there's a balcony on the twentieth floor, while learning the twentieth floor, the user will still need to return to the ground floor to make an outdoor visit. Therefore, especially for tall buildings, current collection methods and absolute altitude determination methods are laborious and time consuming.

Various embodiments provide technical solutions to technical problems relating to determining the absolute altitude of floors and/or levels of a building and/or venue. In particular, operating in the initial floor learning mode enables the mobile apparatus to determine and/or generate an accurate altitude estimate for the initial floor and/or level of the building and/or venue efficiently. The altitude estimate for the initial floor and/or level of the building and/or venue can then be used as an altitude fix while determining altitude estimates for various subsequent floors and/or levels of the building and/or venue. While learning the absolute altitude of subsequent floors and/or levels of the building and/or venue in the subsequent floor learning mode of various embodiments, outdoor visits are not required. This enables a faster and more time effective method for learning the subsequent floors while reducing the effects of GNSS altitude estimate noise on the determined absolute altitudes. Moreover, various embodiments reduce and/or remove the reliance on barometer determined altitude changes and/or include checks on the determined altitude changes to reduce the noise in the determined altitude changes. Thus, various embodiments provide improvements to the process of learning the absolute altitude of floors and/or levels of a building and/or venue by reducing reliance on noisy altitude change data and improving the user experience of a user capturing the floor learning data (e.g., the user operating the mobile apparatus in the first floor learning mode and the subsequent floor learning mode).

Various embodiments also enable the determined altitude estimates to be displayed; stored for future use; provided as input to a positioning algorithm; used to generate, update, and/or maintain a digital map; and/or the like. Thus, various embodiments provide an improvement to the field of indoor positioning by enabling performance of three dimensional indoor positioning (e.g., determining an indoor position estimate that includes absolute altitude in addition to a horizontal position).

Moreover, by enabling the efficient (e.g., in terms of operating time and computational resources) determination of the absolute altitudes of various floors and/or levels within buildings and/or venues, three-dimensional positioning maps can be generated that corresponds to a geographical area that includes a plurality of buildings and/or venues. For example, if the floors and/or levels of a building and/or venue are only known by floor names and/or floor indices, each building and/or venue has to be modeled independently. Thus, various embodiments provide an improved three-dimensional positioning map that can correspond to a geographical area that encompasses multiple buildings and/or venues without requiring individual building models.

In an example embodiment, radio observation data is captured while the mobile apparatus is operating in the initial floor learning mode, secondary floor learning mode, and/or the subsequent floor learning mode. The radio observation data may be used to generate, update, and/or maintain a radio map and/or positioning map for use in radio-based positioning of a geographical area that includes at least a portion of the building and/or venue. Thus, various embodiments enable the simultaneous learning and/or determining of the radio environment within at least a portion of the building and/or venue and the determining and/or generating of altitude estimates for one or more floors and/or levels within the building and/or venue. As such, various embodiments provide further improvements to the technical field of indoor positioning and radio/positioning map generation and/or maintenance.

V. Example Apparatus

The network apparatus 10 and/or mobile apparatus 20 of an example embodiment may be embodied by or associated with a variety of computing devices including, for example, a navigation system, a personal navigation device (PND) or a portable navigation device, a global navigation satellite system (GNSS), a cellular telephone, a mobile phone, a personal digital assistant (PDA), a tablet, a watch, a camera, a computer, and/or other device that can perform positioning and/or navigation-related functions, such as (radio-based) positioning, digital routing, and/or map display. Additionally or alternatively, the network apparatus 10 and/or mobile apparatus 20 may be embodied in other types of computing devices, such as a server, a personal computer, a computer workstation, a laptop computer, a plurality of networked computing devices or the like, that are configured to capture outdoor position estimates, capture sensor data as the mobile apparatus 20 move through a building and/or venue, use the sensor data to determine altitude changes between different floors and/or levels within the building, capture instances of radio observation data, use the determined altitude estimates and/or radio observation data to update a radio map, and/or the like. In an example embodiment, a mobile apparatus 20 is a smartphone, tablet, or other mobile computing entity and a network apparatus 10 is a server. In an example embodiment, a mobile apparatus 20 is an apparatus configured to provide a user with a route (e.g., via user interface 28).

In some embodiments, the processor 12, 22 (and/or co-processors or any other processing circuitry assisting or otherwise associated with the processor) may be in communication with the memory device 14, 24 via a bus for passing information among components of the apparatus. The memory device may be non-transitory and may include, for example, one or more volatile and/or non-volatile memories. In other words, for example, the memory device may be an electronic storage device (e.g., a non-transitory computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the network apparatus 10 and/or mobile apparatus 20 may be embodied by a computing device. However, in some embodiments, the network apparatus 10 and/or mobile apparatus 20 may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12, 22 may be embodied in a number of different ways. For example, the processor 12, 22 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 12, 22 may include one or more processing cores configured to perform independently. A multi-core processor may enable multiprocessing within a single physical package. Additionally or alternatively, the processor 12, 22 may include one or more processors configured in tandem via the bus to enable independent execution of instructions, pipelining and/or multithreading.

In an example embodiment, the processor 12, 22 may be configured to execute instructions stored in the memory device 14, 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the network apparatus 10 and/or mobile apparatus 20 may include a user interface 18, 28 that may, in turn, be in communication with the processor 12, 22 to provide output to the user, such as one or more navigable routes through a road network and/or venue, one or more notifications regarding traffic conditions along at least a portion of a route, and/or the output of one or more other navigation functions, and, in some embodiments, to receive an indication of a user input. As such, the user interface 18, 28 may include one or more output devices such as a display, speaker, and/or the like and, in some embodiments, may also include one or more input devices such as a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor 12, 22 (e.g., memory device 14, 24 and/or the like).

The network apparatus 10 and/or mobile apparatus 20 may optionally include a communication interface 16, 26. The communication interface 16, 26 may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In addition to embodying the network apparatus 10 and/or mobile apparatus 20 of an example embodiment, a navigation system may also include or have access to a geographic database. For example, in various embodiments, a network apparatus 10 and/or mobile apparatus 20 may comprise a component (e.g., memory 14, 24, and/or another component) that stores a digital map (e.g., in the form of a geographic database) comprising a first plurality of data records. In various embodiments, each of the first plurality of data records representing a corresponding TME, wherein at least some of said first plurality of data records map information/data (e.g., the updated map information/data) indicating current traffic conditions along the corresponding TME. In various embodiments, a TME may be a road segment, a traversable lane of a road network, a segment of a pedestrian or bike path, a walkable and/or traversable indoor segment (e.g., within a building and/or venue), and/or the like. For example, the geographic database may include a variety of data (e.g., map information/data) utilized in various navigation functions such as constructing a route or navigation path, determining the time to traverse the route or navigation path, matching a geolocation (e.g., a GNSS determined location) to a point on a map, a lane of a lane network, and/or link, one or more localization features and a corresponding location of each localization feature, and/or the like. For example, a geographic database may include road segment, segment, link, lane segment, or traversable map element (TME) data records, point of interest (POI) data records, localization feature data records, and other data records. In various embodiments, the geographic database comprises a radio map comprising radio models that each represent the coverage area and/or transmission properties of a respective radio node.

More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GNSS data associations (such as using known or future map matching or geo-coding techniques), for example. In an example embodiment, the data records may comprise nodes, connection information/data, intersection data records, link data records, POI data records, and/or other data records. In an example embodiment, the network apparatus 10 may be configured to modify, update, and/or the like one or more data records of the geographic database. For example, the network apparatus 10 may modify, update, generate, and/or the like map information/data corresponding to TMEs, links, lanes, road segments, travel lanes of road segments, nodes, intersection, radio nodes, and/or the like and/or the corresponding data records (e.g., to add or update updated map information/data including, for example, current events and/or conditions along a corresponding TME), a localization layer (e.g., comprising localization features) and/or the corresponding data records, and/or the like.

In an example embodiment, the TME data records are links, lanes, or segments (e.g., maneuvers of a maneuver graph, representing roads, travel lanes of roads, streets, or paths (e.g., pedestrian paths, bike paths, and/or the like), as can be used in the calculated route or recorded route information for determination of one or more personalized routes). The intersection data records are ending points corresponding to the respective links, lanes, or segments of the TME data records. The TME data records and the intersection data records represent a road network, such as used by vehicles, cars, bicycles, and/or other entities. Alternatively, the geographic database can contain path segment and intersection data records or nodes and connection information/data or other data that represent pedestrian paths or areas in addition to or instead of the vehicle road record data, for example.

The TMEs, lane/road/link segments, segments, intersections, and/or nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies a network apparatus 10 and/or mobile apparatus 20 in accordance with an example embodiment may determine the time to traverse a route that includes one or more turns at respective intersections more accurately.

VI. Apparatus, Methods, and Computer Program Products

As described above, FIGS. 3, 4, 5, 6, and 7 illustrate flowcharts of a network apparatus 10 and/or mobile apparatus 20, methods, and computer program products according to an example embodiment of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24 of an apparatus employing an embodiment of the present invention and executed by the processor 12, 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for determining an absolute altitude of one or more floors of a building, the method comprising:
   executing, by one or more processors of a mobile apparatus, application program code to cause the mobile apparatus to operate in an initial floor learning mode, wherein operating in the initial floor learning mode comprises:
   providing, via an interface of the mobile apparatus, an indication to perform one or more outdoor-indoor cycles, wherein each respective outdoor-indoor cycle comprises:
   capturing an outdoor altitude estimate for the mobile apparatus, and
   determining, based at least in part on the outdoor altitude estimate, an instant altitude estimate for an initial floor of the building, and
   determining an absolute altitude estimate for the initial floor based at least in part on one or more instant altitude estimates determined during the one or more outdoor-indoor cycles;
   determining, by the one or more processors, that the absolute altitude estimate for the initial floor satisfies a first threshold certainty;
   responsive to determining that the absolute altitude estimate for the initial floor satisfies the first threshold certainty, executing, by the one or more processors, the application program code to cause the mobile apparatus to operate in a subsequent floor learning mode, wherein operating in the subsequent floor learning mode comprises:
   providing, via the interface, an indication to capture data corresponding to one or more subsequent floors of the building, and
   for each respective subsequent floor of the one or more subsequent floors:
   receiving input via the interface indicating the respective subsequent floor, and based at least in part on the absolute altitude estimate for the initial floor and one or more of (a) a priori floor height information for the building, (b) a sensor-based altitude change estimate, or (c) a determined floor height for the building, determining an absolute altitude estimate for the respective subsequent floor.

2. The method of claim 1, further comprising at least one of: (a) providing the absolute altitude estimate for at least one of (i) the initial floor or (ii) the at least one of the one or more subsequent floors or (b) using the absolute altitude estimate for at least one of (i) the initial floor or (ii) at least one of the one or more subsequent floors to generate or update a digital map.

3. The method of claim 2, wherein the digital map comprises building information for a plurality of buildings, the building information for each respective building comprises an absolute altitude estimate for at least one floor of the respective building.

4. The method of claim 1, further comprising:
   prior to operating in the subsequent floor learning mode, executing the application program code to cause the mobile apparatus to operate in a secondary floor learning mode, wherein operating in the secondary floor learning mode causes the mobile apparatus to determine at least one of (a) an absolute altitude estimate for a secondary floor or (b) the determined floor height for the building;
   wherein the application program code is executed to cause the mobile apparatus to operate in the subsequent floor learning mode responsive to determining that the at least one of (a) the absolute altitude estimate of the secondary floor or (b) the determined floor height for the building satisfies a second threshold certainty.

5. The method of claim 1, further comprising:
   providing an indication of a user-indicated floor and an altitude estimate corresponding to the user-indicated floor as input to a positioning process configured to determine a position estimate for the mobile apparatus; and
   receiving the position estimate.

6. The method of claim 1, wherein the sensor-based altitude change estimate is determined based at least in part on barometer data captured by a barometer of the mobile apparatus.

7. The method of claim 1, further comprising determining a respective absolute altitude estimate for the one or more subsequent floors based on a detected floor change, the detected floor change detected based at least in part on at least one of (a) barometer data captured by a barometer of the mobile apparatus or (b) motion data captured by one or more motion sensors of the mobile apparatus.

8. The method of claim 1, wherein operating in the subsequent floor learning mode further comprises:
   determining whether a subsequent floor indicated by the user input indicating the respective subsequent floor is consistent with at least one of (a) one or more absolute altitude estimates of (i) the absolute altitude estimate for the initial floor and (ii) respective absolute altitude estimates for the one or more subsequent floors or (b) at least one of barometer data or motion data captured by respective sensors of the mobile apparatus; and
   when an inconsistency is determined, at least one of (a) providing an indication of the inconsistency via the interface or (b) not using the indication of user input indicating the respective subsequent floor in determining the absolute altitude estimate for the respective subsequent floor.

9. The method of claim 1, wherein while operating in the initial floor learning mode, an indication to perform an outdoor-indoor cycle is provided at least once every fifteen minutes.

10. The method of claim 1, wherein the at least one outdoor altitude estimate for the mobile apparatus is captured responsive to determining that the mobile apparatus is located outdoors.

11. The method of claim 10, wherein the one or more processors determine that the mobile apparatus is located outdoors based on at least one of user input received via the interface or sensor data captured by one or more sensors of the mobile apparatus.

12. The method of claim 1, wherein providing the indication to capture data corresponding to the one or more subsequent floors comprises providing the indication to capture data without subsequent outdoor visits.

13. An apparatus comprising at least one processor and at least one memory storing computer program code comprising initial floor learning mode program code and subsequent floor learning mode program code, the at least one memory and the computer program code configured to, with the at least one processor, cause the apparatus to at least:
  execute the initial floor learning mode program code to cause the apparatus to operate in an initial floor learning mode, wherein operating in the initial floor learning mode comprises:
  providing, via an interface of the apparatus, an indication to perform one or more outdoor-indoor cycles, wherein each respective outdoor-indoor cycle comprises:
    capturing at least one outdoor altitude estimate for the apparatus, and
    determining, based at least in part on the at least one outdoor altitude estimate, an instant altitude estimate for an initial floor of the building, and
  determining an absolute altitude estimate for the initial floor based at least in part on one or more instant altitude estimates determined during the one or more outdoor-indoor cycles;
  determine that the absolute altitude estimate for the initial floor satisfies a first threshold certainty;
  responsive to determining that the absolute altitude estimate for the initial floor satisfies the first threshold certainty, execute the subsequent floor learning program code to cause the apparatus to operate in a subsequent floor learning mode, wherein operating in the subsequent floor learning mode comprises:
    providing, via the interface, an indication to capture data corresponding to one or more subsequent floors,
    for each respective subsequent floor of the one or more subsequent floors of the building:
      receiving input via the interface indicating the respective subsequent floor, and
      based at least in part on the absolute altitude estimate for the initial floor and one or more of (a) a priori floor height information for the building, (b) a sensor-based altitude change estimate, or (c) a determined floor height for the building, determining an absolute altitude estimate for the respective subsequent floor.

14. The apparatus of claim 13, wherein the at least one memory and the computer program code are further configured to, with the at least one processor, cause the apparatus to perform at least one of (a) providing the absolute altitude estimate for at least one of (i) the initial floor or (ii) at least one of the one or more subsequent floors or (b) using the absolute altitude estimate for at least one of (i) the initial floor or (ii) at least one of the one or more subsequent floors to generate or update a digital map.

15. The apparatus of claim 13, wherein the at least one memory and the computer program code are further configured to, with the at least one processor, cause the apparatus to at least prior to operating in the subsequent floor learning mode, execute secondary floor learning mode program code to cause the mobile apparatus to operate in a secondary floor learning mode, wherein operating in the secondary floor learning mode causes the mobile apparatus to determine at least one of (a) an absolute altitude estimate for a secondary floor or (b) the determined floor height for the building;
  wherein the subsequent floor learning mode program code is executed to cause the apparatus to operate in the subsequent floor learning mode responsive to determining that the at least one of (a) the absolute altitude estimate of the secondary floor or (b) the determined floor height for the building satisfies a second threshold certainty.

16. The apparatus of claim 13, wherein the at least one memory and the computer program code are further configured to, with the at least one processor, cause the apparatus to at least:
  provide an indication of a user-indicated floor and an absolute altitude estimate corresponding to the user-indicated floor as input to a positioning process configured to determine a position estimate for the apparatus; and
  receive the position estimate.

17. The apparatus of claim 13, wherein the sensor-based altitude change estimate is determined based at least in part on barometer data captured by a barometer of the apparatus.

18. The apparatus of claim 13, wherein operating in the subsequent floor learning mode further comprises:
  determining whether a subsequent floor indicated by the user input indicating a respective subsequent floor is consistent with at least one of (a) one or more absolute altitude estimates of (i) the absolute altitude estimate for the initial floor and (ii) respective absolute altitude estimates for the one or more subsequent floors or (b) at least one of barometer data or motion data captured by respective sensors of the apparatus; and
  when an inconsistency is determined, at least one of (a) providing an indication of the inconsistency via the interface or (b) not using the indication of user input indicating the respective subsequent floor in determining the absolute altitude estimate for the respective subsequent floor.

19. The apparatus of claim 13, wherein the at least one outdoor altitude estimate for the apparatus is captured responsive to determining that the apparatus is located outdoors.

20. A non-transitory computer program product comprising at least one non-transitory computer-readable storage medium having computer-readable program code portions stored therein, wherein at least one of (a) the computer-readable program code portions comprise initial floor learning mode program code and subsequent floor learning mode program code or (b) a memory of an apparatus stores the initial floor learning mode program code and the subsequent floor learning mode program code, the computer-readable program code portions comprising executable portions configured, when executed by a processor of the apparatus, to cause the apparatus to:
  execute the initial floor learning mode program code to cause the apparatus to operate in an initial floor learning mode, wherein operating in the initial floor learning mode comprises:
  providing, via an interface of the apparatus, an indication to perform one or more outdoor-indoor cycles, wherein each respective outdoor-indoor cycle comprises:
    capturing at least one outdoor altitude estimate for the apparatus, and
    determining, based at least in part on the at least one outdoor altitude estimate, an instant altitude estimate for an initial floor of a building, and
  determining an absolute altitude estimate for the initial floor based at least in part on one or more instant altitude estimates determined during the one or more outdoor-indoor cycles;
  determine that the absolute altitude estimate for the initial floor satisfies a first threshold certainty;

responsive to determining that the absolute altitude estimate for the initial floor satisfies the first threshold certainty, execute the subsequent floor learning program code to cause the apparatus to operate in a subsequent floor learning mode, wherein operating in the subsequent floor learning mode comprises:

providing, via the interface, an indication to capture data corresponding to one or more subsequent floors of the building, for each respective subsequent floor of the one or more subsequent floors:

receiving input via the interface indicating the respective subsequent floor, and based at least in part on the absolute altitude estimate for the initial floor and one or more of (a) a priori floor height information for the building, (b) a sensor-based altitude change estimate, or (c) a determined floor height for the building, determining an absolute altitude estimate for the respective subsequent floor.

* * * * *